United States Patent
Hara

(10) Patent No.: US 10,943,086 B2
(45) Date of Patent: Mar. 9, 2021

(54) MINUTIA FEATURES GENERATION APPARATUS, SYSTEM, MINUTIA FEATURES GENERATION METHOD, AND PROGRAM

(71) Applicant: NEC CORPORATION, Tokyo (JP)

(72) Inventor: Masanori Hara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/628,537

(22) PCT Filed: Jul. 5, 2018

(86) PCT No.: PCT/JP2018/025546
§ 371 (c)(1),
(2) Date: Jan. 3, 2020

(87) PCT Pub. No.: WO2019/009366
PCT Pub. Date: Jan. 10, 2019

(65) Prior Publication Data
US 2020/0218879 A1    Jul. 9, 2020

(30) Foreign Application Priority Data
Jul. 6, 2017    (JP) .............................. JP2017-132441

(51) Int. Cl.
*G06K 9/00* (2006.01)

(52) U.S. Cl.
CPC ....... *G06K 9/00073* (2013.01); *G06K 9/0008* (2013.01); *G06K 9/00093* (2013.01)

(58) Field of Classification Search
CPC ............. G06K 9/00073; G06K 9/0008; G06K 9/00093; G06T 7/00
See application file for complete search history.

(56) References Cited

U.S. PATENT DOCUMENTS

| | | |
|---|---|---|
| 4,310,827 A | 1/1982 | Asai |
| 7,840,034 B2 | 11/2010 | Takahashi et al. |

(Continued)

FOREIGN PATENT DOCUMENTS

| | | |
|---|---|---|
| JP | 60-12674 B2 | 4/1985 |
| JP | 11-195119 A | 7/1999 |

(Continued)

OTHER PUBLICATIONS

D. Maltoni, "Handbook of Fingerprint Recognition", Springer, 2003, Chapter 3 and Chapter 4, Sec 3.

(Continued)

*Primary Examiner* — Abhishek Sarma
(74) *Attorney, Agent, or Firm* — Sughrue Mion, PLLC

(57) ABSTRACT

A minutia features generation apparatus comprises: an input part to input an image formed as a curved stripe pattern by a ridge line(s); a generation part to generate a skeleton image formed by extracting a skeleton(s) from the image; an extraction part to extract a plurality of minutiae from the skeleton image; and a calculation part configured to calculate a relation minutia feature(s) representing relationship between a first minutia and a second minutia among the plurality of minutiae, wherein the calculation part calculates as one of the relation minutia features defined by a crossing count of the skeleton(s) and a straight line connecting from the second minutia to a nearest neighbor point which is a point on a trace line traced by tracing starting from the first minutia, which point is located at a shortest line distance from the second minutia.

20 Claims, 37 Drawing Sheets

(56) References Cited

U.S. PATENT DOCUMENTS

| | | | | |
|---|---|---|---|---|
| 2004/0208347 | A1* | 10/2004 | Baharav | G06K 9/00046 |
| | | | | 382/124 |
| 2007/0286465 | A1 | 12/2007 | Takahashi et al. | |
| 2011/0200237 | A1 | 8/2011 | Nakamura et al. | |
| 2019/0266380 | A1* | 8/2019 | Lee | G06K 9/00073 |
| 2019/0340411 | A1* | 11/2019 | Lu | G06K 9/00093 |

FOREIGN PATENT DOCUMENTS

| | | |
|---|---|---|
| JP | 2001-076142 A | 3/2001 |
| JP | 2003-274006 A | 9/2003 |
| JP | 2007-328502 A | 12/2007 |
| WO | 2010/044250 A1 | 4/2010 |
| WO | 2017/038695 A1 | 3/2017 |

OTHER PUBLICATIONS

Ko Asai et al., "Automated Fingerprint Identification by Minutia-Network Feature—Feature Extraction Processes—", Journal of the Institution of Electronics, Information and Communication Engineer, May 1989, pp. 724-732, vol. J72-D-II, No. 5.

Ko Asai et al., "Automated Fingerprint Identification by Minutia-Network Feature—Matching Processes—", Journal of the Institution of Electronics, Information and Communication Engineer, May 1989, pp. 733-740, vol. J72-D-II, No. 5.

"American National Standard for Information Systems-Data Format for the Interchange of Fingerprint, Facial, & Scar Mark & Tattoo(SMT) Information", NIST Special Publication 500-245, Sep. 2000, pp. 1-69.

International Search Report for PCT/JP2018/025546 dated Aug. 28, 2018. []PCT/ISA/210.

* cited by examiner

FIG. 3
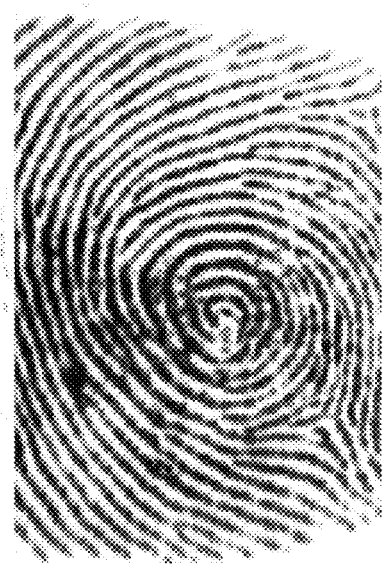
(b)
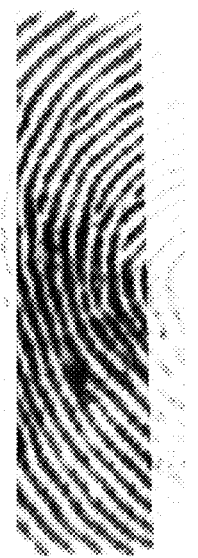
(c)
(a)

FIG. 6
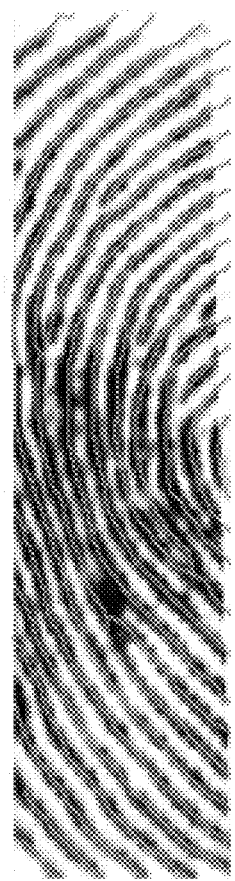

FIG. 8
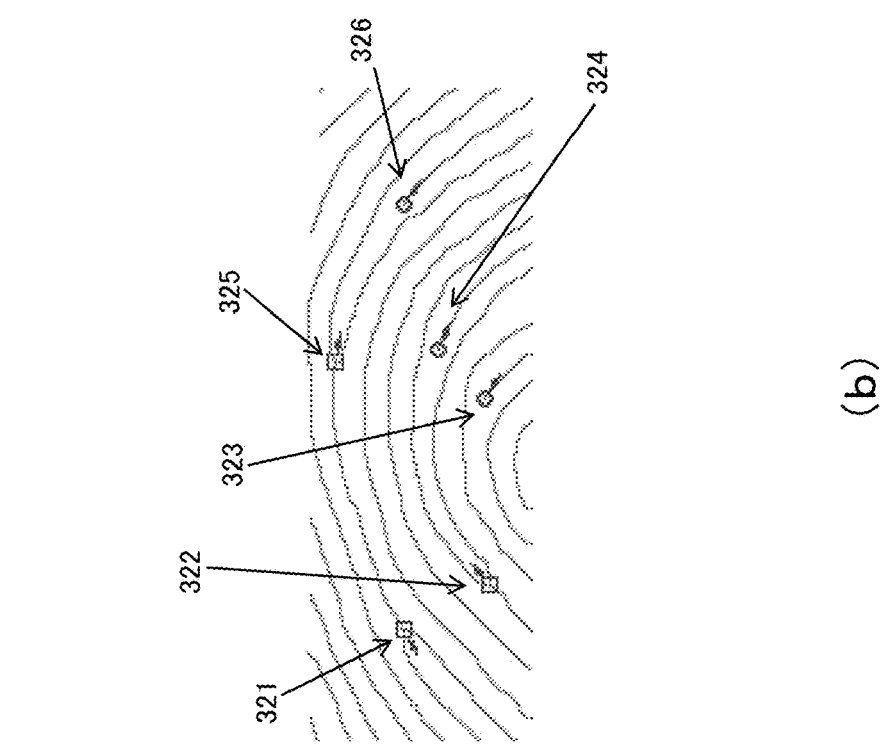
(b)
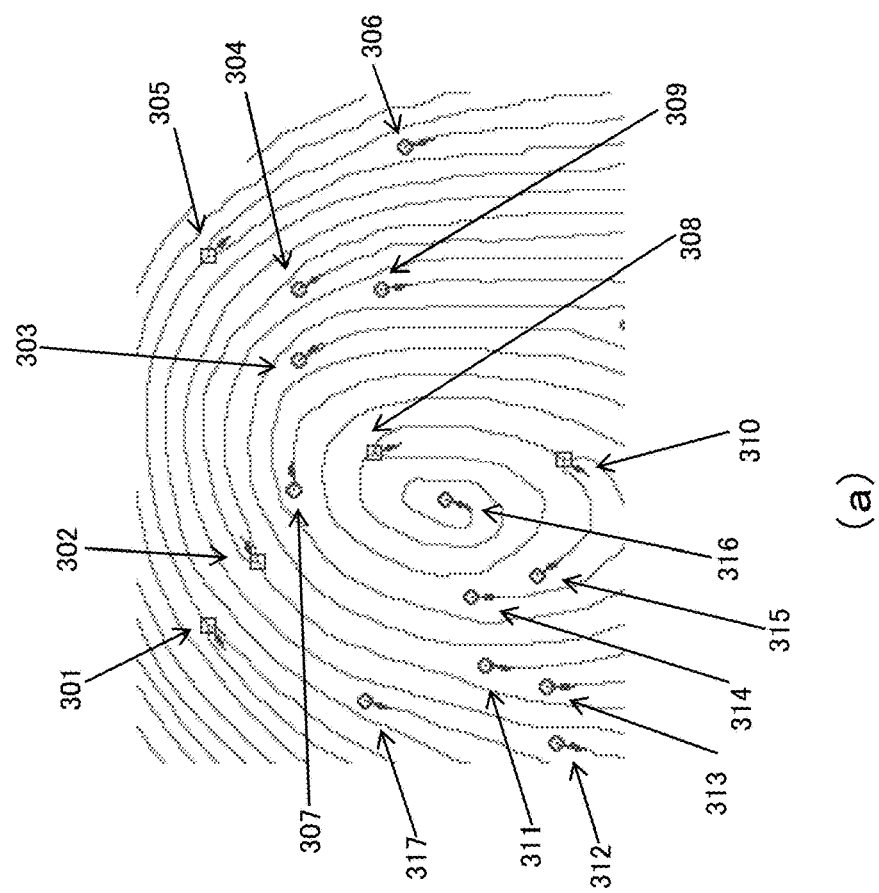
(a)

FIG. 12

BASIC MINUTIA FEATURES

| MINUTIA | MINUTIA POSITION | MINUTIA TYPE | MINUTIA DIRECTION |
|---|---|---|---|
| 301 | (X1, Y1) | BIFURCATION POINT | θ1 |
| 302 | (X2, Y2) | BIFURCATION POINT | θ2 |
| 303 | (X3, Y3) | END POINT | θ3 |
| ... | ... | ... | ... |

FIG. 18

| PARENT MINUTIA | RELATION MINUTIA FEATURES | | | |
|---|---|---|---|---|
| | CHILD MINUTIA | CHILD MINUTIA RELATIVE DIRECTION | CHILD MINUTIA RELATIVE POSITION | CONTOUR SKSLETON COUNT |
| 301 | 302 | BACKWARD | RIGHT | 2 |
| | 303 | BACKWARD | RIGHT | 5 |
| | 304 | BACKWARD | RIGHT | 3 |
| | 305 | BACKWARD | — | 0 |
| | 306 | BACKWARD | — | 0 |
| | ... | ... | ... | ... |
| | 317 | FORWARD | LEFT | 1 |
| 302 | 301 | BACKWARD | RIGHT | 2 |
| | ... | ... | ... | ... |

FIG. 29

MINUTIA FEATURES (ID=0001)

| MINUTIA | MINUTIA POSITION | MINUTIA TYPE | MINUTIA DIRECTION | CHILD MINUTIA | CHILD MINUTIA RELATIVE DIRECTION | CHILD MINUTIA RELATIVE POSITION | CONTOUR SKELETON COUNT | CONNECTION TYPE |
|---|---|---|---|---|---|---|---|---|
| 301 | (X1, Y1) | BIFURCATION POINT | $\theta 1$ | 302 | BACKWARD | RIGHT | 2 | — |
|  |  |  |  | 303 | BACKWARD | RIGHT | 5 | — |
|  |  |  |  | 304 | BACKWARD | RIGHT | 3 | — |
|  |  |  |  | 305 | BACKWARD | — | 0 | TYPE 12 |
|  |  |  |  | 306 | BACKWARD | — | 0 | — |
|  |  |  |  | ... | ... | ... | ... | ... |
|  |  |  |  | 317 | FORWARD | LEFT | 1 | — |
| 302 | (X2, Y2) | BIFURCATION POINT | $\theta 2$ | 301 | BACKWARD | RIGHT | 2 | — |
|  | ... | ... | ... | ... | ... | ... | ... | ... |

FIG. 31

MINUTIA FEATURES

| MINUTIA | MINUTIA POSITION | MINUTIA TYPE | MINUTIA DIRECTION | CHILD MINUTIA | CHILD MINUTIA RELATIVE DIRECTION | CHILD MINUTIA RELATIVE POSITION | CONTOUR RIDGE COUNT | CONNECTION TYPE |
|---|---|---|---|---|---|---|---|---|
| 321 | (X3, Y3) | BIFURCATION POINT | θ3 | 322 | BACKWARD | RIGHT | 2 | — |
| | | | | 323 | BACKWARD | RIGHT | 5 | — |
| | | | | 324 | BACKWARD | RIGHT | 3 | — |
| | | | | 325 | BACKWARD | — | 0 | TYPE 12 |
| | | | | 326 | FORWARD | — | 0 | — |
| 322 | (X4, Y4) | BIFURCATION POINT | θ4 | 321 | BACKWARD | LEFT | 2 | — |
| ... | ... | ... | ... | ... | ... | ... | ... | ... |

FIG. 34

| MATCHING RESULT | |
|---|---|
| ID INFORMATION | MATCHING SCORE |
| ID=0101 | A1 |
| ID=0103 | A2 |
| ... | ... |

MINUTIA FEATURES GENERATION APPARATUS, SYSTEM, MINUTIA FEATURES GENERATION METHOD, AND PROGRAM

CROSS-REFERENCE TO RELATED APPLICATIONS

The present invention is a National Stage of International Application No. PCT/JP2018/025546 filed Jul. 5, 2018, based upon and claims the benefit of the priority of Japanese Patent Application No. 2017-132441 (filed on Jul. 6, 2017), the disclosure of which is incorporated herein in its entirety by reference. The present invention relates to a minutia features generation apparatus, system, minutia features generation method and program. More specifically, the present invention relates to a minutia features generation apparatus, a system, a minutia features generation method and a program for processing image data of curved striped pattern, specifically, fingerprint image or the like.

BACKGROUND

A fingerprint and a palmprint configured of a lot of ridge lines in a curved striped pattern are used as means for personal identification since a long time. Especially, a matching processing using a latent fingerprint left at crime scenes is an effective crime investigation means. Many of police agencies have introduced a computer-based fingerprint matching system (AFIS; Automated Fingerprint Identification System).

In the fingerprint matching system, identification of a person corresponding to the latent fingerprint is made by matching each feature points (hereinafter referred as minutia (e)) of the latent fingerprint collected at crime scenes with the fingerprint minutiae registered in a data base. For the minutiae (fingerprint minutia) used by the fingerprint matching, end points or bifurcation points of the fingerprint ridge lines are often used. For example, "4.3 Minutia-Based Method" in Non Patent Literature 1 discloses methods for minutia matching using the end points and the bifurcation points of the fingerprint ridge lines.

When matching high-quality fingerprint images such as an impressed fingerprint(s), the quality of the fingerprint image is high enough, so that presence of significant image distortion is rare. Therefore, in case of between high-quality fingerprint images, locations where corresponding minutiae (so-called paired minutiae) exist are also at the similar positions. Also, as for the fingerprint image such as the impressed fingerprint, there are a sufficient number of minutiae in many cases. For these reasons, in the matching process of high-quality fingerprint image such as the impressed fingerprints, it is often possible to ensure high matching accuracy without executing special processing. That is, high matching accuracy can be guaranteed even by the existing minutia matching technology.

However, as described above, when fingerprint matching is regarded as a means for the crime investigation, it is often necessary to perform the matching process between the impressed fingerprint and the latent fingerprint. Images related to the latent fingerprint often has a noticeable image distortion or has a small area image showing only a part of the entire fingerprint. In such matching process of the latent fingerprints and the impressed fingerprint, the locations of the corresponding minutia may be significantly different between the impressed fingerprint and the latent fingerprint due to the image distortion of the latent fingerprint. Still more, in case the latent fingerprint is an image of a small area with a small size, it may not be possible to extract a sufficient number of minutiae necessary for the matching process from the latent fingerprint concerned.

Under these circumstances, it is difficult to ensure high accuracy in the matching process of latent fingerprints and impressed fingerprints.

In view of the above, various techniques have been proposed for improving the accuracy of matching between the latent fingerprints and the impressed fingerprints. For example, Non Patent Literature 2 and 3 disclose that not only the minutia but also "inter-minutia ridge line count" is used as a new minutia feature.

In the Non Patent Literature (NPL) 2 and 3, the "inter-minutia ridge line count" is calculated as a new minutia feature. For the calculation of "inter-minutia ridge line count" in Non Patent Literatures 2 and 3, firstly, the skeletons (ridge lines) are extracted from the fingerprint image. After that, the minutiae are extracted from the extracted skeletons, and a network between each of the minutiae is calculated based on a relationship between each minutia and a minutia located in the vicinity thereof. After that, the "inter-minutia ridge line count" is calculated as the minutia features in addition to the location(s) and the direction(s) of the minutia(e), and the type of minutia such as the end point or the bifurcation point, and the connection relationship of the minutia network(s). The "inter-minutia ridge line count" is calculated as the number of intersections between edges (line segments connecting minutiae one to another) and the ridge lines in the minutia point network. That is, the "inter-minutia ridge line count" is the number of ridge lines intersecting with a straight line when two minutiae are connected by the straight line concerned. More precisely, the number of intersections between the straight line connecting two minutiae and the ridge lines that are not directly connected with the two minutiae concerned represents the "inter-minutia ridge line count".

Patent Literature (PTL) 1 discloses that "ridge connection relation information" between two neighboring minutiae is used as a new minutia feature. Patent Literatures 2 to 4 disclose extraction of the minutiae, and calculation of various minutia features featuring the minutia, and the like.

Patent Literature 1 discloses a technique of tracing skeleton(s) to extract "ridge connection relation information" from a target minutia to a neighboring minutia. Further, in Patent Literature 1 discloses a method for a skeleton tracing, in which, as a starting point of the skeleton tracing, not only the target minutia and the neighboring minutia, but also a projected minutia is defined in an orthogonal direction from each minutia, and the skeleton tracing is performed from the defined projected minutia. The number of ridge lines included in the "ridge connection relation information" disclosed in Patent Literature 1 is more robust against image distortion, unlike the "inter-minutia ridge line count" disclosed in Non Patent Literatures 2 and 3.

However, the technique disclosed in Patent Literature 1 has a problem in that the number of ridge lines between any of two minutia points cannot be extracted because the first minutia encountered by the skeleton tracing is extracted as the neighboring minutia. Also, since by Patent Literature 1, the minutiae are extracted using the skeleton tracing, in case the skeleton is interrupted due to a noise (for example, blurring of the image) or presence of a sweat pore(s), a minutia existing beyond the interruption cannot be detected as the neighboring minutia. Here, the problem will be described with reference to FIG. 37. Note that the FIG. 37 is a diagram that is drafted with additional illustration to explain above mentioned problem from FIG. 9 in Patent Literature 1.

Referring to FIG. 37, the skeleton connected to a target minutia P54 is traced, and the minutia P55 is extracted. Since the minutia P55 is connected to the same skeleton as the target minutia P54, the order (n) becomes "0". A distance between the target minutia P54 and the minutia point P55 is regarded as a minutia feature (0th order principal distance). As described in Patent Literature 1, the minutia feature (0th order principal distance) represents the distance from a nearest connected neighboring minutia, however, there is a wide variety of connection types between minutiae, so that such minutia feature has a limited contribution to the accuracy improvement in the matching process.

Moreover, in Patent Literature 1, a vertical line is drawn in a vertical direction from the target minutia P54, and a point of intersection of the vertical line with a skeleton is calculated as a "trace distance measurement starting point". In Patent Literature 1, by the skeleton tracing performed from this trace distance measurement starting point, the first minutia encountered is extracted as the neighboring minutia, and the distance between the trace distance measurement starting point and the neighboring minutia is calculated as another minutia feature. For example, the distance between the trace distance measurement starting point Q54 and the minutia P53 is calculated as a "first order sub-distance".

The analyses on the literatures of the citation list in the disclosure of the present application have been made by the inventors of the present invention.

PTL 1: Japanese Patent Kokai Publication No. H11-195119A
PTL 2: Japanese Patent Kokoku Publication No. S60-012674B
PTL 3: WO. Patent Publication No. 2017-038695A
PTL 4: Japanese Patent Kokai Publication No. 2003-274006A
NPL 1: D. Maltoni, "Handbook of Fingerprint Recognition", Springer, 2003
NPL 2: K. Asai et al., "Automated Fingerprint Identification by Minutia-Network Feature—Feature Extraction Process—", Journal of the Institution of Electronics, Information and Communication Engineer, D-II Vol. J72-D-II, No. 5, pp. 724-732, May 1989.
NPL 3: K. Asai et al., "Automated Fingerprint Identification by Minutia-Network Feature—Matching Processes—", Journal of the Institution of Electronics, Information and Communication Engineer, D-II Vol. J72-D-II, No. 5, pp. 733-740, May 1989.

SUMMARY

As described above, Patent Literature 1 proposes the "inter-minutia ridge lines count" that is robust against the image distortion. However, in the fingerprint image, there may exist a skeleton that is not connected to the target minutia and does not intersect with the straight line extending in the vertical direction from the target minutia as in the skeletons as shown in FIG. 37. In this case, an end point is formed as a minutia 402 on a skeleton 401, however, the minutia 402 cannot be extracted as the neighboring minutia by the method disclosed in Patent Literature 1.

It is a main object of the present invention to provide a minutia features generation apparatus, a system, a minutia features generation method, and a program that calculate minutia features which contribute to the improvement of matching accuracy.

According to a first aspect of the invention, there is provided a minutia features generation apparatus, comprising: an input part configured to input an image formed as a curved stripe pattern by a ridge line(s); a generation part configured to generate a skeleton image formed by extracting a skeleton(s) from the image; an extraction part configured to extract a plurality of minutiae from the skeleton image; and a calculation part configured to calculate a relation minutia feature(s) representing relationship between a first minutia and a second minutia among the plurality of minutiae, wherein, the calculation part calculates as one of the relation minutia features defined by a crossing count of the skeleton(s) and a straight line connecting from the second minutia to a nearest neighbor point which is a point on a trace line traced by tracing starting from the first minutia, which point is located at a shortest line distance from the second minutia.

According to a second aspect of the invention, there is provided a system comprising: a minutia features generation apparatus, and a matching apparatus configured to perform matching of images using the minutia features generated by the minutia features generation apparatus, wherein the minutia features generation apparatus comprises: an input part configured to input an image formed as a curved stripe pattern by a ridge line(s); a generation part configured to generate a skeleton image formed by extracting a skeleton(s) from the image; an extraction part configured to extract a plurality of minutiae from the skeleton image; and a calculation part configured to calculate a relation minutia feature(s) representing relationship between a first minutia and a second minutia among the plurality of minutiae, wherein the calculation part calculates as one of the relation minutia features defined by a crossing count of the skeleton(s) and a straight line connecting from the second minutia to a nearest neighbor point which is a point on a trace line traced by tracing starting from the first minutia, which point is located at a shortest line distance from the second minutia.

According to a third aspect of the invention, there is provided a minutia features generation method comprising, inputting an image formed as a curved stripe pattern by a ridge line(s); generating a skeleton image formed by extracting a skeleton(s) from the image; extracting a plurality of minutiae from the skeleton image; and calculating a relation minutia feature(s) representing relationship between a first minutia and a second minutia among the plurality of minutiae, wherein the step of calculation to calculate as one of the relation minutia features defined by a crossing count of the skeleton(s) and a straight line connecting from the second minutia to a nearest neighbor point which is a point on a trace line traced by tracing starting from the first minutia, which point is located at a shortest line distance from the second minutia.

According to a fourth aspect of the invention, there is provided a program configured to cause a computer to execute: a process of inputting to input an image formed as a curved stripe pattern by a ridge line(s); a process of generating a skeleton image formed by extracting a skeleton(s) from the image; a process of extraction to extract a plurality of minutiae from the skeleton image; and a process of calculation to calculate a relation minutia feature(s) representing relationship between a first minutia and a second minutia among the plurality of minutiae, wherein the process of calculation to calculate as one of the relation minutia features defined by a crossing count of the skeleton(s) and a straight line connecting from the second minutia to a nearest neighbor point which is a point on a trace line traced by tracing starting from the first minutia, which point is located at a shortest line distance from the second minutia. The program may be recorded on a computer readable storage medium. The storage medium may be non-transient such as semiconductor memory, a hard disk, a magnetic recording medium, an optical recording medium or the like. The present invention may be embodied as a computer program product.

According to each aspect of the present invention, there are provided the minutia features generation apparatus, the system, the minutia features generation method, and the program that contribute to calculate the minutia features contributing to the improvement of matching accuracy.

BRIEF DESCRIPTION OF THE DRAWINGS

FIG. 3 is a diagram showing an example of the fingerprint image according to the first exemplary embodiment.

FIG. 6 is a diagram showing an example of a skeleton image.

FIG. 8 shows a diagram showing an example of minutiae.

FIG. 12 shows a diagram showing an example of basic minutia features.

FIG. 18 shows a diagram showing an example of the relation minutia features.

FIG. 29 shows a diagram showing an example of the minutia features which are an output of a minutia features output part.

FIG. 31 shows a diagram showing an example of the minutia features calculated by the matching apparatus according to the first exemplary embodiment.

FIG. 34 is a diagram showing an example of matching result by a matching apparatus according to the first exemplary embodiment.

MODES

Figure 1:
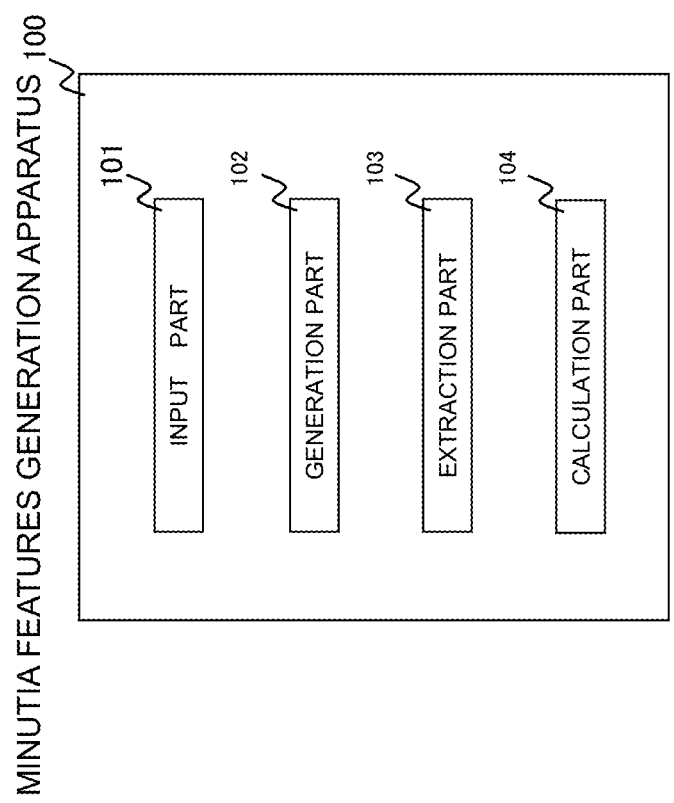
FIG. 1 is a diagram describing an outline of an exemplary embodiment.

First, an overview of an exemplary embodiment will be described. Reference signs in each drawing given in this overview are given to each element for convenience as an example to help understanding, and the description of this overview does not intend to impose any limitation. Connection lines between blocks in respective diagrams may be both bidirectional and unidirectional. Unidirectional arrows schematically show flow of main signals (data), but do not exclude bidirectionality. In addition, although not explicitly disclosed, in the circuit diagrams, block diagrams, internal configuration diagrams, connection diagrams and the like, shown in the disclosure of the present disclosure, input ports and output ports are present at respective input terminals and output terminals of each connection line. The same applies for input/output interfaces.

A minutia features generation apparatus 100 according to one exemplary embodiment includes an input part 101, a generation part 102, an extraction part 103, and a calculation part 104. The input part 101 inputs an image in which a curved stripe pattern is formed by ridge lines. The generation part 102 generates a skeleton image obtained by extracting a thin line (termed "skeleton" herein) from the image. The extraction part 103 extracts a plurality of minutiae from the skeleton image. The calculation part 104 calculates a relation minutia feature(s) that indicates a relationship between the first minutia and the second minutia among the plurality of minutiae. Further, the calculation part calculates, as one of relation minutia features, a count of crossing of the skeletons and a straight line connecting from the second minutia to a nearest neighbor point which is a point on a trace line obtained by tracing starting from the first minutia, which point is located at a shortest line distance from the second minutia point.

The minutia features generation apparatus 100 arbitrarily selects two minutiae among the minutiae extracted from the skeleton image, and sets them as a target of calculation for relation minutia features. For example, the minutia features generating apparatus 100 extracts a predetermined number of minutiae in the order of the close distance to the minutia (first minutia, or parent minutia to be described later), and selects as a target minutia (second minutia, or child minutia to be described later) for calculating the relation minutia features. For this reason, even minutiae that could not be made target in Patent Literature 1 can be used as a target for the minutia features calculation.

Also, the minutia features generation apparatus 100 calculates a number of skeletons (ridge lines) existing between the first minutia and the second minutia as one of the relation minutia features. At that time, the minutia features generating apparatus 100 calculates the relation minutia features by using the minutia that is closest to the second minutia (the nearest neighbor minutia) which is on the trace line obtained by the tracing starting from the first minutia. That is, the minutia features generating apparatus 100 calculates the trace line by the tracing (such as a ridge line direction tracing, to be described later) starting from the first minutia, and calculates a count of skeleton(s) between the nearest neighbor minutia which is on the trace line and whose distance from the second minutia is the closest and the second minutia, so that it is possible to calculate a minutia feature that is not affected by image distortion.

In addition, since the relation minutia feature calculated by the minutia features generating apparatus 100 increases the minutia feature that features the minutia extracted from the image, the matching accuracy can be improved even in the case where an image extracted only by a small number of minutiae is the target of the matching.

As described above, the minutia features generation apparatus 100 according to the exemplary embodiment can generate a minutia feature that can realize high matching accuracy even in the case where an image with remarkable distortion or an image of a small region is the matching target.

Hereinafter, the exemplary embodiment will be concretely described in further detail, with reference to the figures. The same reference numeral is given to the same component(s) in the respective exemplary embodiments, and description thereof will be omitted.

First Exemplary Embodiment

A first exemplary embodiment will be described in detail with reference to the drawings.

Figure 2:
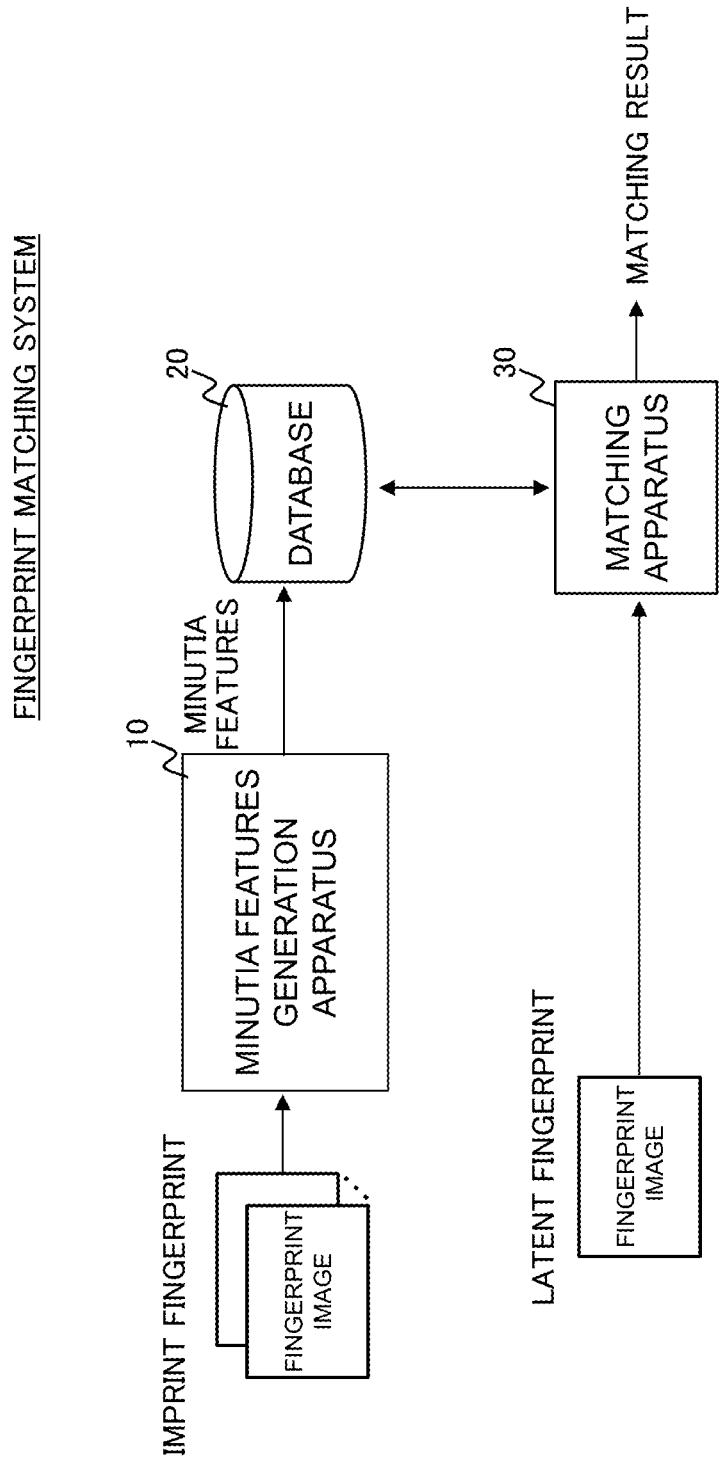
FIG. 2 is a diagram showing an example of a configuration of a fingerprint matching system according to a first exemplary embodiment.

FIG. 2 is a diagram showing an example of the configuration of the fingerprint matching system according to the first exemplary embodiment. By referring to FIG. 2, the fingerprint matching system is configured by comprising, a minutia features generation apparatus 10, a database 20, and a matching apparatus 30.

The minutia features generation apparatus 10 is an apparatus that receives as input data related to a fingerprint image and its ID (Identifier) information, and generates minutia features featuring the input fingerprint image. The minutia features generation apparatus 10 outputs the input fingerprint image, minutia features calculated from the fingerprint image, and ID information of the fingerprint image to the database 20.

The database 20 is an apparatus that stores the fingerprint image, its minutia features, and ID information associated with each other.

The matching apparatus 30 is an apparatus that receives the fingerprint image and performs matching process on the fingerprint image. The matching device 30 performs matching process on the fingerprint image, by calculating the minutia features of the same type as the minutia features generated by the minutia features generation apparatus 10 from the input fingerprint image, and by using the calculated minutia features and the minutia features stored in the database 20. The matching apparatus 30 outputs a candidate of fingerprint image having the same or similar minutia features, by comparing the minutia features obtained from the input fingerprint image with the minutia features obtained from the database 20.

Here, impressed fingerprints are fingerprints collected for the purpose of registration in the database or the like, and has a characteristic that the area of the ridge line is broad, and the quality is high. On the other hand, latent (residual) fingerprints are those left behind at crime scenes or the like, in which there are frequently cases where image distortion is significant, and the area of clear ridge line region(s) is small.

In general, it is often difficult to perform matching using the latent fingerprint with low quality. In the viewpoint of above, in the first exemplary embodiment, the minutia features generation apparatus 10 receives as input an image related to the impressed fingerprint, the matching apparatus 30 receives a fingerprint image related to the latent fingerprint, and the following explanation will be given.

FIG. 3 is a diagram showing an example of the fingerprint image according to the first exemplary embodiment. Here, the examples of the fingerprint image starting from FIG. 3 are images obtained by digitizing the fingerprint image read by a sensor or a scanner.

The fingerprint images shown in FIG. 3($a$) and FIG. 3($b$) are an example of fingerprint images of the same finger of the same person. Comparing the two fingerprint images of FIG. 3($a$) and FIG. 3($b$), it can be seen that the fingerprint image shown in FIG. 3($b$) has remarkable image distortion compressed in the vertical direction.

FIG. 3($c$) shows an example of the fingerprint image obtained by cutting out a part of the fingerprint image shown in FIG. 3($b$). The fingerprint image shown in FIG. 3($c$) is a partial area of the fingerprint image shown in FIG. 3($b$), and the fingerprint image can be treated (or regarded) as a latent fingerprint. The fingerprint image shown in FIG. 3($c$) is not easy for matching because the image has remarkable distortion and the ridge line area is narrow.

In the first exemplary embodiment, explanation follows provided that the fingerprint image shown in FIG. 3($a$) is the impressed fingerprint (the fingerprint image whose minutia features are registered in the database 20), and the fingerprint image shown in FIG. 3 ($c$) is the target of matching as the latent fingerprint. That is to say, the minutia features generation apparatus 10 calculates the minutia features from the fingerprint image (impressed fingerprint) shown in FIG. 3($a$), and the matching apparatus 30 calculates the minutia features from the fingerprint image (latent fingerprint) shown in FIG. 3 ($c$).

However, to be described later on, since the minutia features calculation process of the matching apparatus 30 can be the same as the minutia features calculation process of the minutia features generation apparatus 10, in the following description, images related to the impressed fingerprint and the latent fingerprint will be described together.

Also, in the first exemplary embodiment, a case will be described in which the minutia features generation apparatus 10 handles the impressed fingerprint and the matching apparatus 30 handles the latent image fingerprint, however, it is not to be understood that such description will limit the scope of fingerprint image in each apparatus shown in FIG. 2. For example, the matching apparatus 30 may not have the minutia features calculation function, and the minutia features generation apparatus 10 may generate the minutia features from the latent fingerprint and provide the minutia features to the matching apparatus 30. Also, fingerprints to be matched may be between the impressed fingerprints, or may be between the latent fingerprints. Concretely, for the purpose of criminal investigation, the first exemplary embodiment is configured as described above in consideration of the fact that there are many cases where matching of the latent fingerprint and the impressed fingerprints is performed.

[Hardware Configuration]

A hardware configuration of various apparatuses making up the fingerprint matching system according to the first exemplary embodiment will be described.

Figure 4:
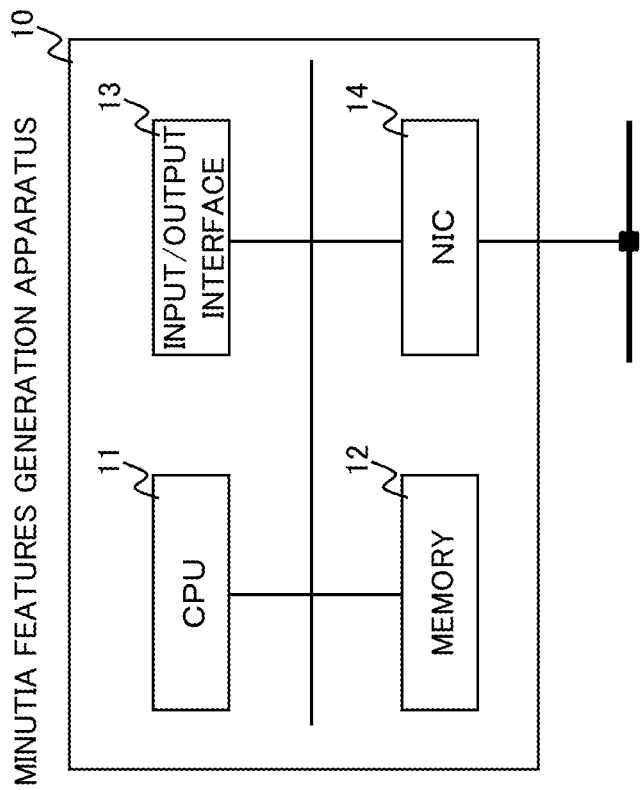
FIG. 4 is a block diagram showing an example of hardware configuration for a minutia features generation apparatus according to the first exemplary embodiment.

FIG. 4 is a block diagram showing an example of hardware configuration of the fingerprint minutia features generation apparatus 10 according to the first exemplary embodiment. The minutia features generation apparatus 10 can be configured by a so-called computer (information processing apparatus), and has a configuration shown in FIG. 4. For example, the minutia features generation device 10 comprises a CPU (Central Processing Unit) 11, a memory 12, an input output interface 13, a NIC (Network Interface Card) 14 that is a communication interface, and the like, which are connected to each other via an internal bus.

However, it is not to be understood that the hardware configuration of minutia features generation apparatus 10 as shown in FIG. 4 is limited hereto. The minutia features generation apparatus 10 may include hardware which are not shown, or may not include the input output interface 13 as necessary. For example, in the case where information is input or output, to or from the minutia features generation apparatus by an operation terminal connected via a network, the input output interface 13 may be unnecessary. Also, it is not to be understood that the number of CPU and the like included in the minutia features generation apparatus 10 is limited to the example shown in FIG. 4, and multiple CPUs may be included in the minutia features generation apparatus 10.

The memory 12 is a RAM (Random Access Memory), a ROM (Read Only Memory), or an auxiliary storage device (such as a hard disk).

The input output interface 13 is an interface of a display device or an input device (not shown). The display device is, for example, a liquid crystal display, and the like. The input device is, for example, a device that accepts user operations such as a keyboard and a mouse, and a device that inputs (receives) information from an external storage device such as a USB (Universal Serial Bus) memory, and the like. Also, included are devices such as a sensor and a scanner that convert the fingerprint images into digital data as input devices. The user inputs necessary information to the minutia features generation apparatus 10 using the keyboard, the mouse, and the like.

The functions of the minutia features generation apparatus 10 are realized by a processing module(s) described later. The processing module, for example, is realized by the CPU 11 executing a program stored in the memory 12. Also, the program can be downloaded via the network or updated using the storage medium that stores the program. Moreover, the processing module may be realized by a semiconductor chip. That is, the functions performed by the processing module only needs to be realized by at least any one of any hardware and software.

Also, by installing the above-described computer program in the storage unit of the computer, the computer can function as the minutia features generation apparatus 10. Moreover, by causing the computer program to execute the above-described computer program, the minutia features generation method can be executed by the computer.

Also, since the hardware configuration of the minutia features generation apparatus 10 and the matching apparatus 30 can be the same, explanation on the hardware of the matching apparatus 30 is omitted. Further, since the hardware configuration and operation of the database 20 are apparent to those skilled in the art, the explanation thereof is omitted.

[Minutia Features Generation Apparatus]

Figure 5:
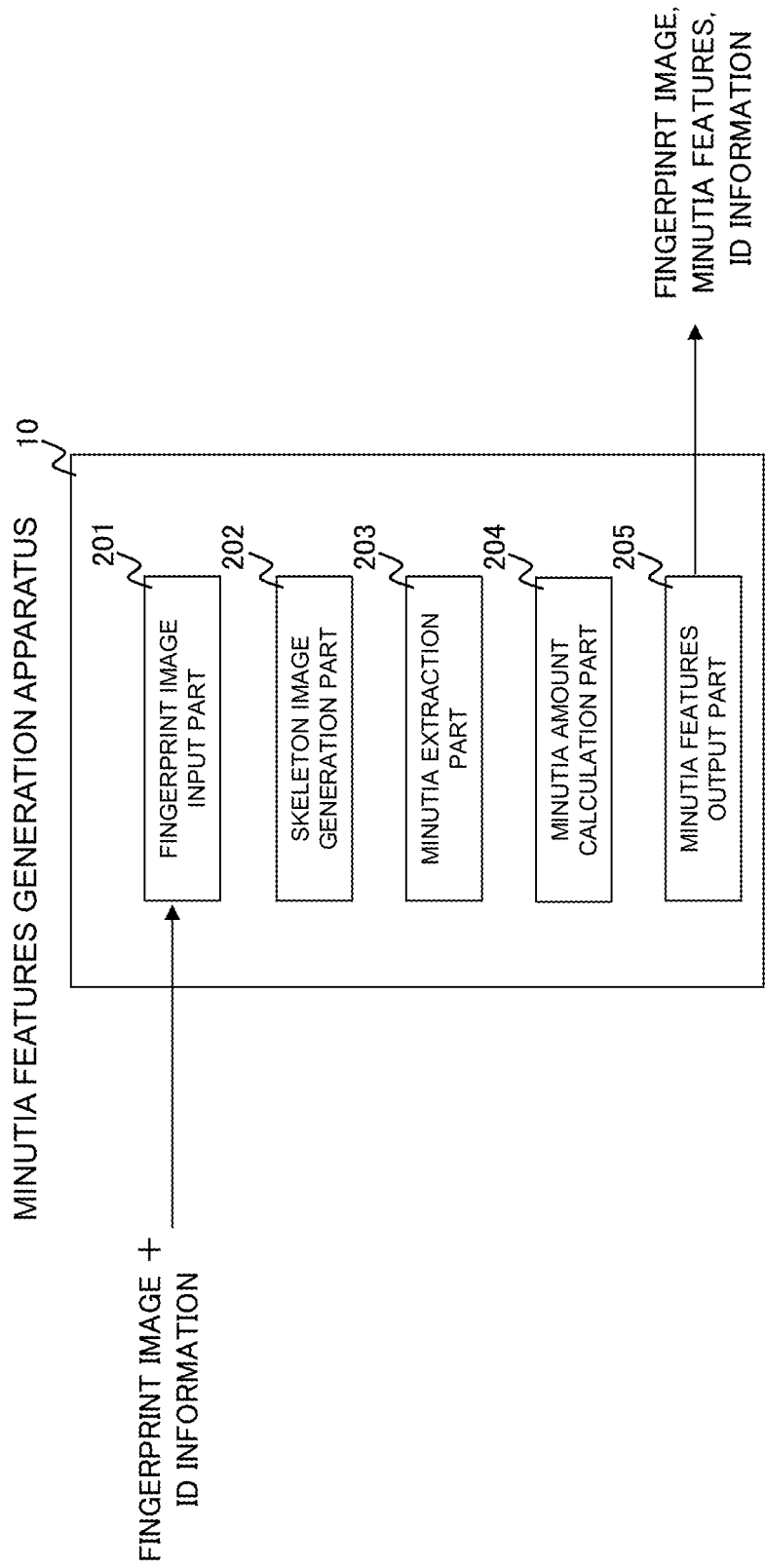
FIG. 5 is a diagram showing an example of process configuration for the minutia features generation apparatus according to the first exemplary embodiment.

FIG. 5 is a diagram showing an example of the process configuration of the minutia features generation apparatus 10. By referring to FIG. 5, the minutia features generation apparatus 10 is configured by comprising, a fingerprint image input part 201, a skeleton image generation part 202, a minutia extraction part 203, a minutia features calculation part 204, and a minutia features output part.

Also, each part such as the fingerprint image input part 201 is configured to be able to exchange data with each other and to access data stored in the memory 12. Each part such as the skeleton image generation part 202 uses the memory 12 as a work area and as a storage area of data.

The fingerprint image input part 201 is a means configured to receive the fingerprint image (the image in which a curved stripe pattern is formed by ridge lines) and ID information of the fingerprint image. For example, the fingerprint image input part 201 imports digitalized data (image file) of the fingerprint image to store in the external storage medium such as the USB memory, and stores the data in the memory 12. Or, the fingerprint image input part 201 may input (receive) data relating to the fingerprint image, and the like via the network. Or, not using a configuration to input digitized fingerprint image from outside, the fingerprint image input part 201 may digitize the fingerprint image using the scanner or the like connected to or incorporated in the minutia features generation apparatus 10.

Here, there is a standardized standard for the fingerprint image. Concretely, the U.S. National Institute of Standards and Technology standardized the standard described as ANSI/NIST-ITL-1-2000 Data Format for the Interchange of Fingerprint, Facial, & Scar Mark & Tattoo (SMT) Information. Now, the standard document can be downloaded from below URL at the timing of the application. https://www.nist.gov/system/files/documents/itl/ansi/sp500-245-a16.pdf It is preferred that the fingerprint image input part 201 can handle the digitized fingerprint image (for example, a fingerprint image with a resolution of 500 dpi) based on the above standard.

The skeleton image generation part 202 is a means configured to generate the skeleton image in which thin lines are extracted from the acquired fingerprint image. For example, the skeleton generation part 202 generates skeleton images as shown in FIG. 6. FIG. 6(*a*) is a diagram showing an example of skeleton image that is generated from the fingerprint image (impressed fingerprint) as shown in FIG. 3 (*a*). FIG. 6(*b*) is a diagram showing an example of skeleton image that is generated from the fingerprint image (latent fingerprint) as shown in FIG. 3 (c). Here, in FIG. 6, for ease of understanding, the skeleton image is superposed on the fingerprint image.

The skeleton image generation part 202 can use the skeleton image extraction method disclosed in "3 Fingerprint Analysis and Representation" of Non-Patent Literature 1. Therefore, although a detailed description regarding the generation of skeleton image is omitted, the skeleton image generation part 202 generates the skeleton image in the following outline procedure.

First, the skeleton image generation part 202 extracts the direction of the ridge line of the fingerprint image. Thereafter, the skeleton image generation unit 202 enhances contrast of each ridge line along the ridge line direction, and generates a binary image. Thereafter, the skeleton image generation part 202 extracts the skeleton data (generates skeleton image) by thinning the binary image.

Here, the skeleton image generation part 202 generates "ridge line direction data" and stores it in the memory 12 in the course of the skeleton image generation process. More concretely, the skeleton image generation part 202 calculates the ridge line direction at each point on the ridge line of the fingerprint image, and generates a set of ridge line directions as "ridge line direction data". For example, the skeleton image generation part 202 calculates the ridge line direction of the fingerprint image by setting the point (pixel on the skeleton) at which ridge line direction data is calculated as the origin of the XY coordinate system, and the fingertip of the fingerprint image as the Y axis positive direction, and by calculating the angle spanned by the ridge line direction and X axis. Thereafter, the skeleton image generation part 202 converts (approximates) the calculated angle into a direction obtained by dividing the quadrants of the XY coordinate system by a predetermined number (such as 16), and generates the ridge line direction at each point. Here, in case a region where no ridge line exists is present in the fingerprint image, the skeleton image generation part 202 generates ridge line direction data using ridge direction data adjacent to the region. For example, it is possible to cope with using the adjacent ridge line direction data as it is, or using the average of the adjacent ridge line direction data as the ridge line direction data, or so on.

The set of the ridge line direction at each point including the ridge line of the fingerprint image becomes the "ridge line direction data". That is, in addition to the generation of the skeleton image, the skeleton image generation part 202 generates the ridge line direction data including information on the ridge line direction at each point on the ridge line forming the fingerprint image. Note that the ridge line direction data and its utilization are described in the reference literature (Japanese Patent Kokai 2007-226746A), so that the skeleton image generation part 202 can make use of the method disclosed in this literature.

Figure 7:
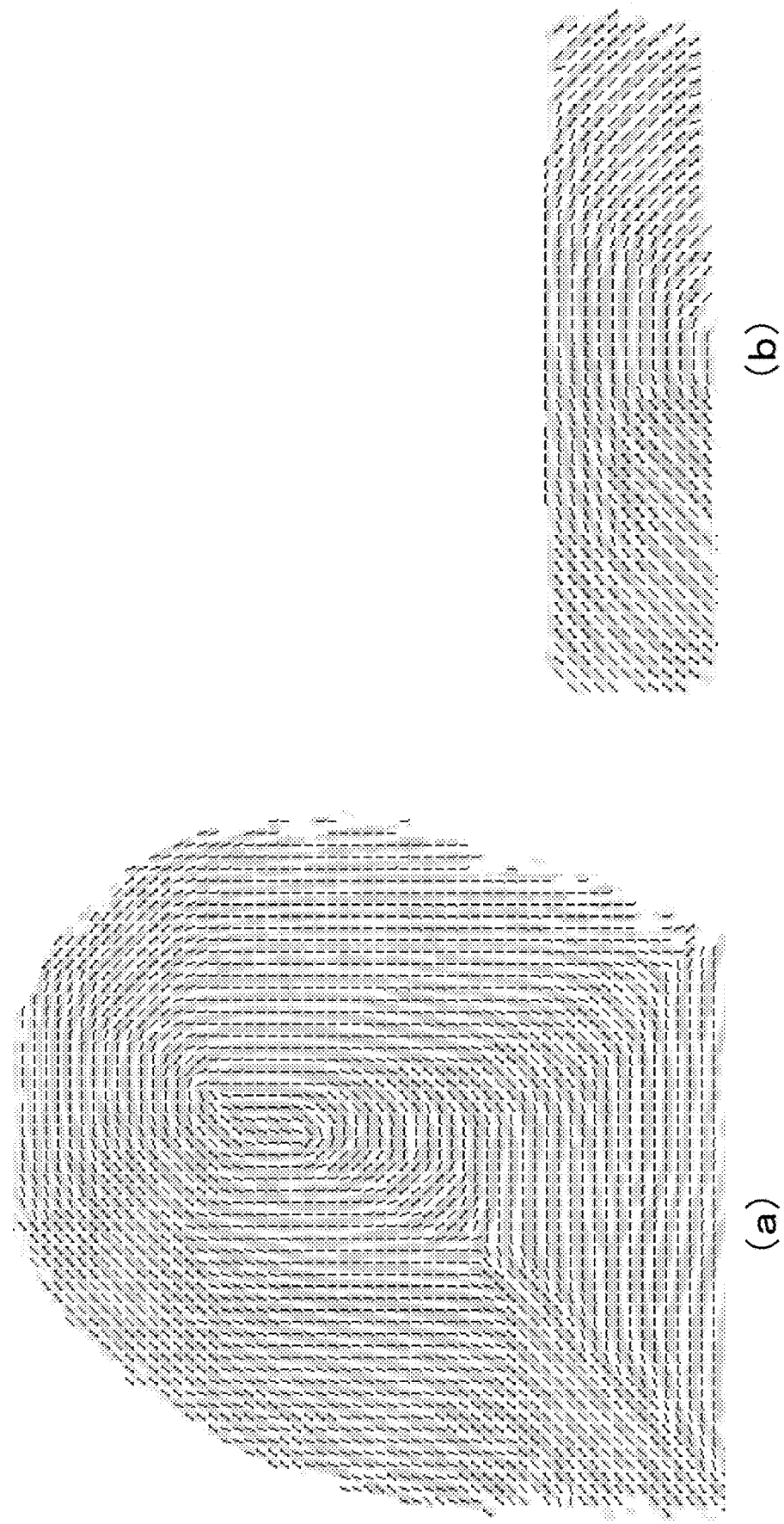
FIG. 7 is a diagram showing an example of a ridge line direction data.

FIG. 7 is a diagram showing an example of the ridge line direction data. FIG. 7(a) shows an example of the ridge line direction data corresponding to the skeleton image shown in FIG. 6(a), and FIG. 7(b) shows an example of the ridge line direction data corresponding to the skeleton image shown in FIG. 6(b). Note that, in FIG. 7, the ridge line direction data is displayed superposed on the fingerprint image as in FIG. 6.

The minutia extraction part 203 is a means for extracting minutiae from the skeleton image. More concretely, the minutia extraction part 203 extracts minutiae by extracting bifurcation points and end points of the skeleton lines from the skeleton image generated by the skeleton image generation part 202. Furthermore, the minutia extraction method disclosed in "3 Fingerprint Analysis and Representation" of Non-Patent Literature 1 can be used as a procedure for extracting minutia from the skeleton image. Therefore, the detailed explanation regarding on minutia extraction is omitted. In addition, the minutia extraction part 203 may extract a singular point (core type singular point, delta type singular point) from the fingerprint image and use it as one of the minutia features upon extracting minutiae.

FIG. 8 is a diagram of an example showing the minutia. FIG. 8 (a) is an example of the minutia extracted from a part of the skeleton image as shown in FIG. 6 (a). FIG. 8 (b) is an example of the minutiae extracted from a part of the skeleton image as shown in FIG. 6 (b). The minutia extraction part 203 extracts, for example, minutiae from 301 to 317 as shown in FIG. 8(a), and registers the position of each minutia and its type (bifurcation point, end point) in the memory 12.

Further, in figures including FIG. 8, end points are shown as circles and bifurcation points are shown as squares. Also, as to be described later, the minutia calculation part 204 extracts a minutia direction on each minutia as one of minutia features, however, the display of the minutia direction is shown as straight line with bulge. For example, the minutia direction of minutia 301 (bifurcation point) is toward lower left as shown in FIG. 8(a).

The minutia features calculation part 204 is a means configured to calculate the minutia features that feature the extracted minutiae. The minutia features calculated by the minutia features calculation part 204 include basic minutia feature(s), relation minutia feature(s), and connection type(s).

The basic minutia features include position of the minutia, type of minutia, and minutia direction that features the minutia by the direction. The position, the type, and the minutia direction are the minutia features that provide the basis for calculating the relation minutia feature(s) and the connection type described above.

The relation minutia feature(s) is the feature that indicates a relationship between two minutiae. Hereinafter in explanation, the minutia for calculating the relation minutia feature(s) is expressed as "parent minutia". Also, the minutia that is paired with the parent minutia, and whose relation minutia feature(s) is to be calculated, is expressed as "child minutia".

The relation minutia features comprise three minutia features: i.e., contour skeleton count, child minutia relative direction, and child minutia relative position.

The contour skeleton count is a minutia feature determined by the number of skeletons existing between a skeleton in which the parent minutia exists and a skeleton in which the child minutia exists provided that the skeleton (ridge line) in the fingerprint image is regarded as contour line (contour).

The child minutia relative direction is a minutia feature indicating whether a tracing direction used upon identifying the nearest neighbor point whose details will be described later is the same direction as or opposite direction to the minutia direction of the parent minutia. That is, the child minutia relative direction is a minutia feature indicating whether the child minutia is located in the same direction as the minutia direction of the parent minutia or in the opposite direction.

The child minutia relative position is a minutia feature determined by a position where the child minutia exists based on the tracing direction used upon identifying the nearest neighbor point. For example, in case where the nearest neighbor point is set as the origin of the XY coordinate system and the tracing direction of the ridge line is set as the positive direction of the Y-axis, if the child minutia is positioned in the first or fourth quadrant, the child minutia relative position of the child minutia is on the "right side", or if the child minutia is positioned in the second or third quadrant, the child minutia relative position of the child minutia is on the "left side". That is, the child minutia relative position is the minutia feature indicating whether the child minutia exists on the left side or the right side when the tracing direction is upward at the nearest neighbor point.

The connection type is a minutia feature indicating a connection type between the following two minutiae, when the parent minutia and the child minutia are connected by at least one skeleton.

Hereinafter, three minutia features mentioned above will be sequentially explained.

Figure 9:
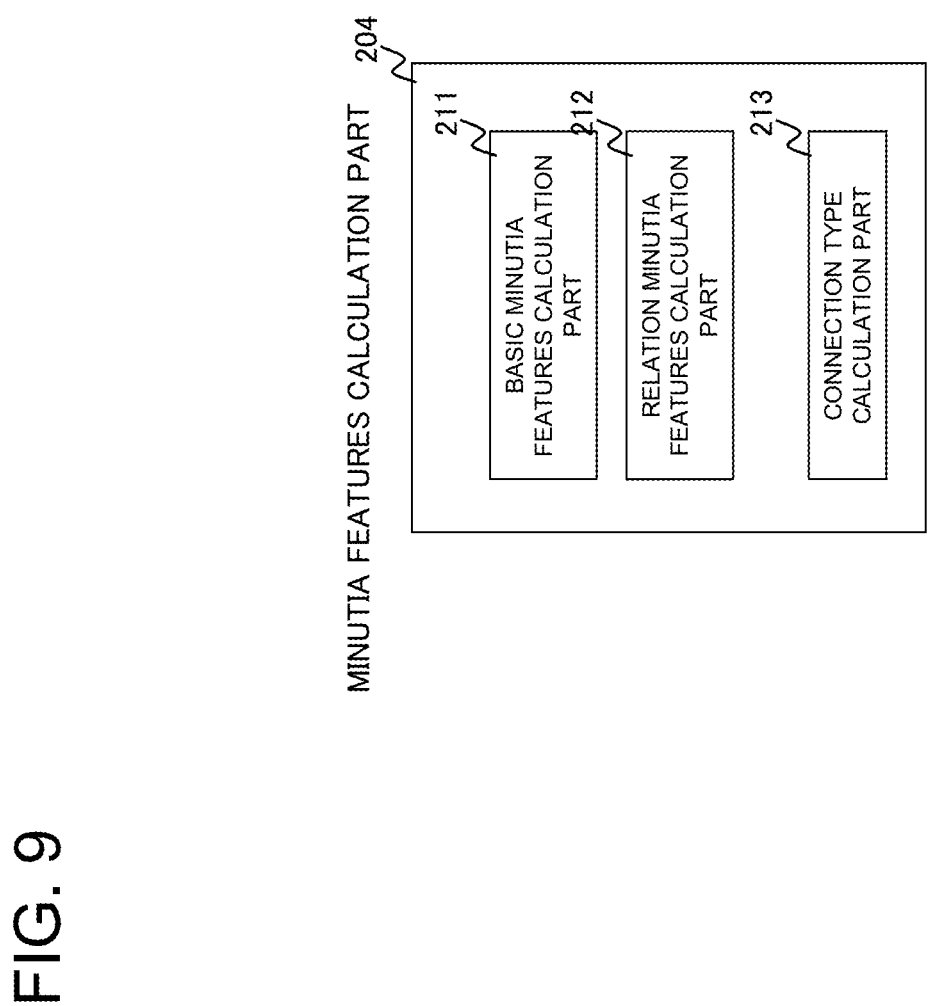
FIG. 9 is a diagram showing an example of process configuration for a minutia features calculation part according to the first exemplary embodiment.

FIG. 9 is a diagram of an example showing process configuration of the minutia features calculating part 204. By referring FIG. 9, the minutia features calculation part 204 includes three sub-modules, comprising: a basic minutia features calculation part 211, a relation minutia features calculation part 212, and a connection type calculation part 213.

The basic minutia features calculation part 211 is a means configured to calculate the position, the direction, and the type of the minutia extracted from the skeleton image as the minutia features that feature the extracted minutiae. In more detail, the basic minutia features calculation part 211 mainly calculates the minutia direction.

Figure 10:
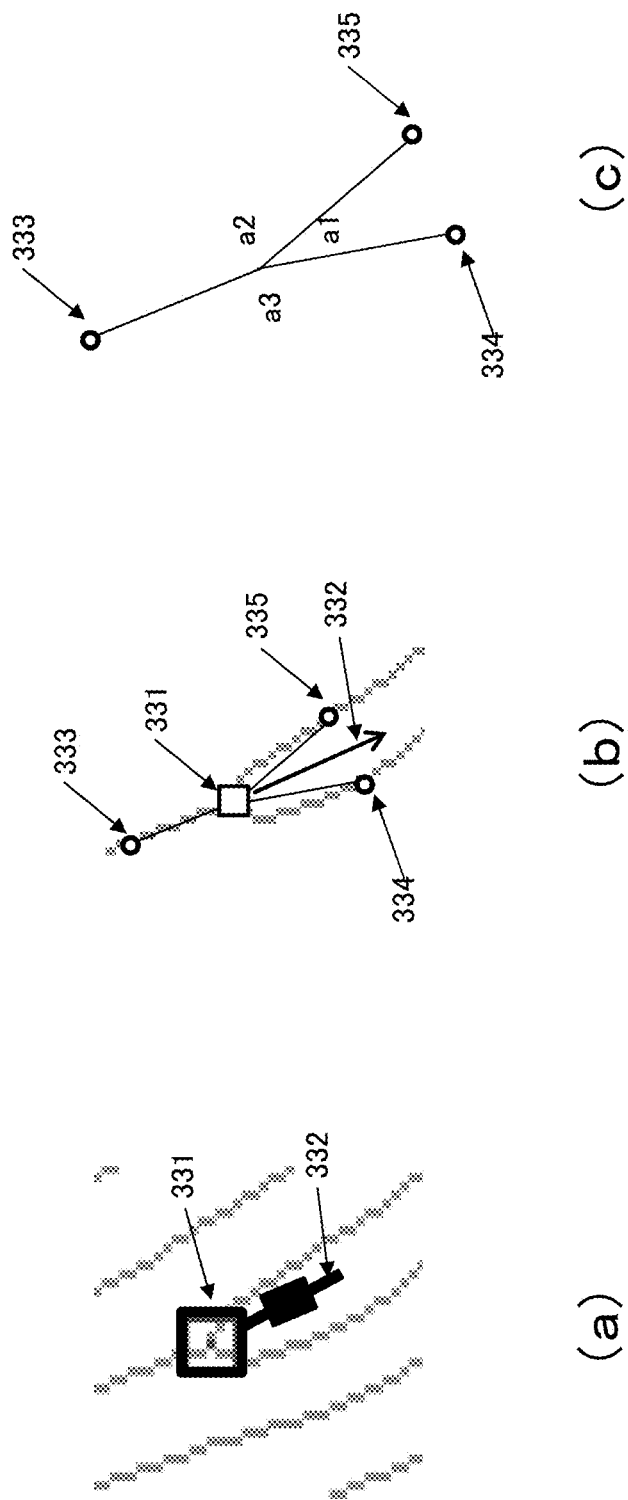
FIG. 10 shows a diagram explaining a calculation of a minutia direction.

First, explanation on the calculation of the minutia direction for the bifurcation point is given. Here, calculation of a minutia direction 332 of a bifurcation point 331 shown in FIG. 10(a) will be explained.

First, the basic minutia features calculation part 211 determines three trace end points from 333 to 335 by tracing each of the three skeletons (tracing back on the skeleton) forming the bifurcation point 331 by a predetermined distance from the bifurcation point 331 (Ref. FIG. 10(b)).

Next, the basic minutia features calculation part 211 calculates three angles from a1 to a3 formed (spanned) by three straight lines defined by the bifurcation point 331 and the three trace end points from 333 to 335, respectively (Ref. FIG. 10(c)).

Next, the basic minutia features calculation part 211 selects the smallest angle among the three calculated angles, and calculates the direction that bisects the smallest angle as the minutia direction 332 (Ref. FIG. 10(b)).

Figure 11:
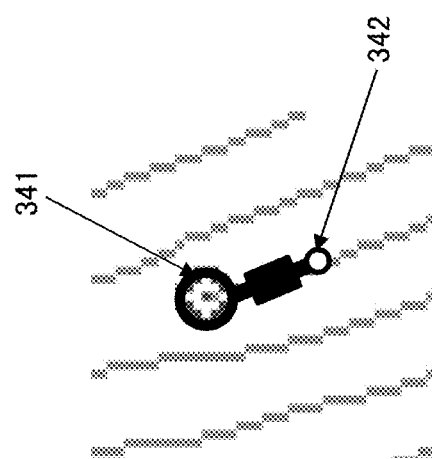
FIG. 11 shows a diagram explaining a calculation of the minutia direction.

Next, explanation will be given on the calculation of the minutia direction for the end point by referring to FIG. 11.

First, the basic minutia features calculation part 211 traces a predetermined distance on the skeleton forming a trace end point from an end point 341, and calculates the trace end point 342. The basic minutia features calculation part 211 calculates the direction from the end point 341 toward the trace end point 342, as the minutia direction of the end point 341.

Here, the minutia direction is expressed as a minutia feature using an angle formed (spanned) by the X axis in the XY coordinate system (two-dimensional coordinate system) in the fingerprint image and a straight line defined by the minutia direction.

The basic minutia features calculation part 211 performs the mentioned processing on the minutiae extracted by the minutia extraction unit 203 to calculate the basic minutia features. For example, the basic minutia features calculation part 211 calculates information as shown in FIG. 12 as the basic minutia features. Note that Information relating to the minutia position and the minutia type of each minutia is calculated using the minutia information extracted by the minutia extraction part 203.

The relation minutia features calculation part 212 is a means configured to calculate the relation minutia features. Concretely, the relation minutia features calculation part 212 counts the number of intersection times that a straight line connecting the nearest neighbor point with the child minutia, the nearest neighbor point being on the trace line corresponding to the skeleton on which the parent minutia exists, and having the shortest straight line distance from the child minutia, intersects with the skeleton(s) between the nearest neighbor point and the child minutia, and determines the number of intersection times as one of the minutia features defined as "contour skeleton count". Also, in the process of calculating the contour skeleton count, the feature values related to the child minutia relative direction and the child minutia relative position are calculated. Details about mentioned trace line will be explained later.

Figure 13:
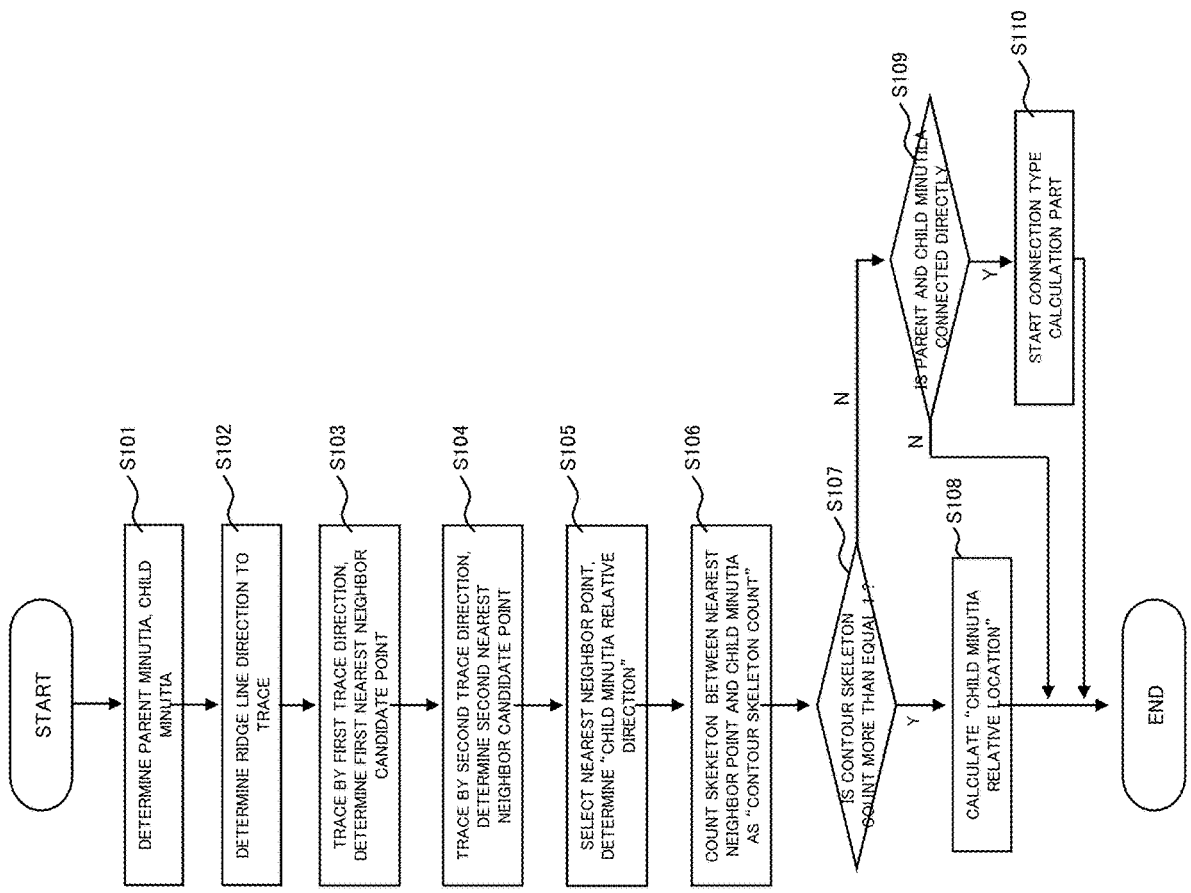
FIG. 13 is a flowchart showing an example of operations of a calculation part of relation minutia features according to the first exemplary embodiment.

FIG. 13 is a flowchart of an example of operation of the relation minutia features calculation part 212. By referring to FIG. 13, operations on the relation minutia features calculation part 212 will be explained.

In step S101, the relation minutia features calculation part 212 determines the minutiae (the parent minutia, the child minutiae) for calculating the relation minutia features. Concretely, the relation minutia features calculation part 212 selects a parent minutia from a plurality of minutiae, then extracts a predetermined number of minutiae in the order of proximity to the parent minutia, and sets the extracted minutia(e) as child minutia(e). Here, a case is considered where 16 minutiae close to the parent minutia are set as child minutiae. In this case, in the example shown in FIG. 8(a), if the minutia 301 is set as the parent minutia, the minutiae from 302 to 317 are selected as child minutiae.

Here, the number of child minutiae is an example, and it is needless to say that the number of child minutiae to be selected is not limited. Increasing the number of child minutiae improves matching accuracy, but also increases the load (computation amount) related to the relation minutia features calculation. Therefore, it is preferred to select an appropriate number of child minutiae in consideration of the contribution of relation minutia features to matching accuracy improvement and the load related to the minutia features calculation concerned.

When the parent minutia and the child minutiae are determined, the relation minutia features calculation part 212 selects one of the child minutiae, and performs ridge line direction tracing using ridge line direction data starting from the parent minutia. The relation minutia features calculation part 212 calculates the trace line described above by performing ridge line direction tracing. Here, details of ridge line direction tracing using ridge line direction data are described in the above reference materials, and the same method as the ridge line direction tracing described in the materials can be used, so the description will be made briefly as below.

Figure 14:
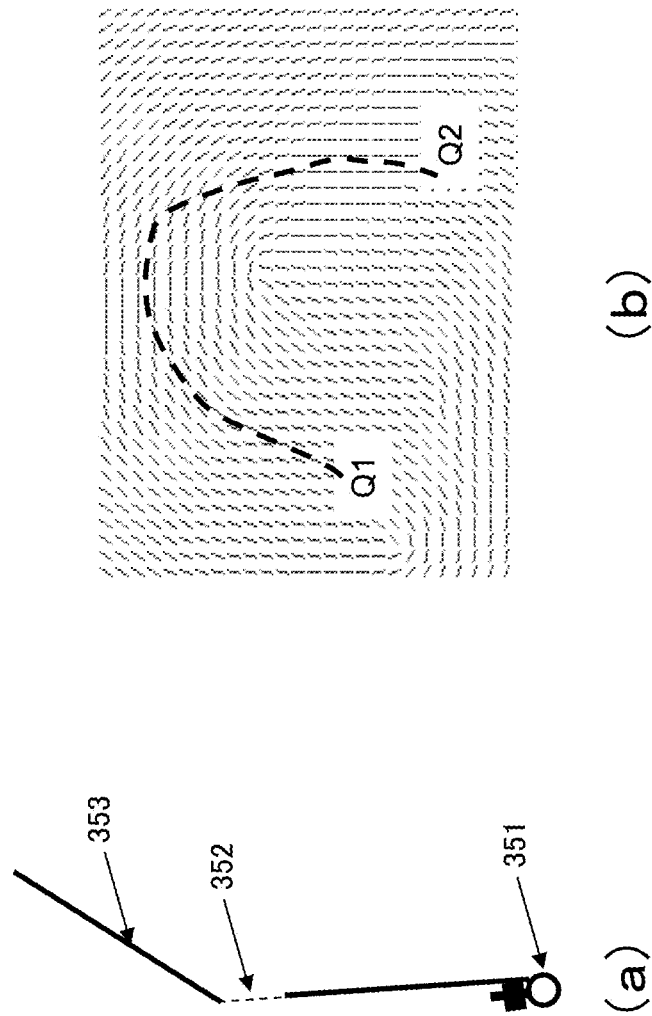
FIG. 14 shows a diagram explaining tracing of a ridge line using ridge line direction data.

For example, set an end point 351 shown in FIG. 14 as the starting point of the ridge line direction tracing. Initially, the relation minutia features calculation part 212 traces (go up) along the ridge line direction in a predetermined direction (initial direction; for example, the same direction as the minutia direction of the end point 351) from the start point (that is, the end point 351). As a result of tracing, if the ridge line direction data is interrupted, the relation minutia features calculation part 212 shifts by a predetermined distance in the same direction as the trace direction (in case of FIG.

14(a), shifts over a dotted line 352). As a result of the shift, when another ridge line direction data 353 is encountered, the relation minutia features calculation part 212 traces along the ridge line direction data 353. The tracing on the ridge line direction data as described above is repeated, and when the traced distance reaches a predetermined distance, the ridge line direction tracing terminates.

In addition, when the ridge line direction tracing is performed, the relation minutia features calculation part 212 performs two direction tracing in the directions one that matches the minutia direction of the minutia that is the starting point of the tracing, and the other being direction of opposite to the minutia direction (a direction that is inverted by 180 degrees). The result (track) obtained by the ridge line direction tracing in two directions performed by the relation minutia features calculation part 212 becomes a trace line.

Figure 15:
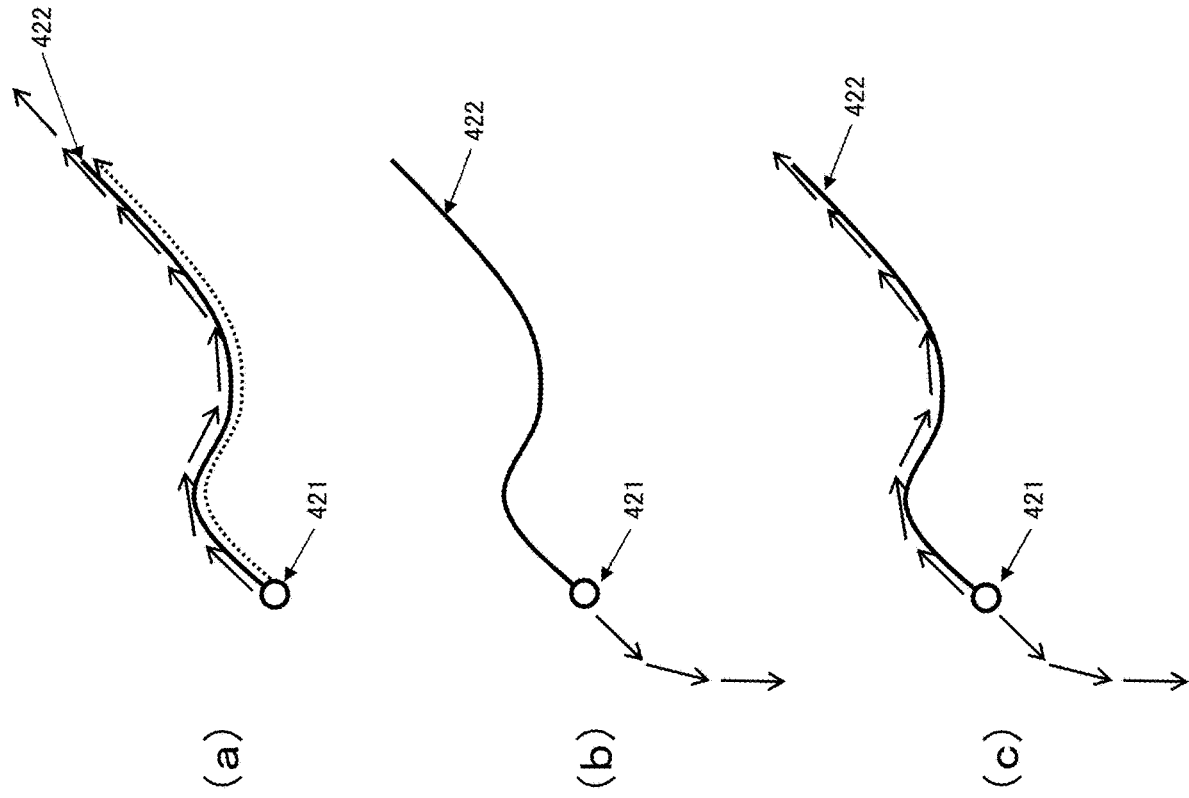
FIG. 15 shows a diagram explaining tracing of the ridge line using the ridge line direction data.

Here, when performing a ridge line direction tracing, if the initial direction of the trace traces on (along) the skeleton, a part of a trajectory (track) obtained by the ridge line direction tracing substantially matches a track obtained by the skeleton tracing. For example, by referring to FIG. 15(a), in case an end point 421 is the starting point, and the upper right direction which is the minutia direction is the initial direction of the ridge line direction tracing, the track (thin solid line with arrows), obtained by the ridge line direction tracing and trace obtained on (along) the skeleton 422, on which the end point 421 exists, both tracks are substantially match each other. On the other hand, in case performing the ridge line direction tracing, if the initial direction of the tracing is not the direction shifting on (along) the skeleton, there is no direct relationship between a track obtained by the ridge direction line tracing and the skeleton. For example, as shown in FIG. 15(b), in case the ridge line direction tracing is executed in a direction opposite to the minutia direction of the end point 421, the resultant track (thin solid line with arrows) obtained by the tracing and the skeleton 422, both tracks have no direct relationship.

The trace line corresponds to the track of the tracing by the ridge line direction tracing in two directions. Concretely, the thin solid line with arrows shown in FIG. 15(a) and the thin solid line with arrows shown in FIG. 15(b) are the trace lines. Here, as is clear from the explanation above, the trace lines, that is, results of performing the ridge line direction tracing in two directions starting from the minutia on the skeleton includes the skeleton in a part thereof. For example, as shown in FIG. 15(c), the trace line substantially includes the skeleton 422.

By referring to FIG. 14, in case the parent minutia exists at the point Q1 as shown in FIG. 14(b), and the minutia direction is toward the upper right, tracing is performed along a route indicated by a dotted line(s), and the ridge line direction tracing terminates at the point Q2.

Note that, the ridge line direction tracing and skeleton tracing are different methods. The skeleton tracing is a tracing by a predetermined distance literally along the skeleton. Thus, in case the skeleton is interrupted due to sweat pore and so on, the skeleton tracing is terminated at the end of the skeleton (i.e., the end point). Therefore, with the normal skeleton tracing, the trace lines explained with reference to FIG. 14 and FIG. 15 cannot be obtained. However, in case the end point or bifurcation point is encountered during skeleton tracing, the above trace lines can be obtained by tracing the valley line by shifting the tracing one to the valley line at the bifurcation point (or end point) of the valley line existing in the vicinity thereof. Here, the valley line indicates a black and white inverted image obtained by inverting the pixel values of the skeleton. That is, an image in which a ridge-line-groove (white background) is assumed as the ridge line is a black/white inverted image. In this way, it is also possible to obtain the trace line by performing the skeleton line tracing using the black/white inverted image. Here, even for the trace line obtained by the skeleton tracing using the black/white inverted image, a part thereof substantially matches the skeleton.

In step S102, the relation minutia features calculation part 212 determines the direction of the ridge line direction tracing. In more detail, the relation minutia features calculation part 212 determines a first trace direction, by setting the minutia direction of the parent minutia as the first trace direction, and a second trace direction, by setting the direction opposite to the minutia direction of the parent minutia (a direction obtained by rotating the minutia direction by 180 degrees).

In step S103, the relation minutia features calculation part 212 sets the parent minutia as the start point of tracing, and performs the ridge line direction tracing in the first trace direction as an initial direction. At that time, the relation minutia features calculation part 212 determines a first nearest neighbor candidate point (point (pixel) on the trace) that is the point on the trace line and has a shortest distance from the child minutia.

In step S104, the relation minutia features calculation part 212 sets the parent minutia as the start point of the tracing, and performs the ridge line direction tracing in the second trace direction as the initial direction. At that time, the relation minutia features calculation part 212 determines a second nearest neighbor candidate point (point (pixel) on the trace) that is a point on the trace line and has a shortest distance from the child minutia Here, depending on the positional relationship between the parent minutia point and the child minutia, the parent minutia (start point) may be the first or second nearest neighbor candidate point. Also, it is preferred to limit the trace distance in the processes of steps S103 and S104 in advance. For example, it is preferred to limit the trace distance to be about twice of the simple distance connecting the parent minutia and the child minutia.

In step S105, the relation minutia features calculation part 212 selects, as the "nearest neighbor point", the nearest neighbor candidate point that is closer to the child minutia among the first and second nearest neighbor candidate points.

In addition, the relation minutia features calculation part 212 determines a "child minutia relative direction" based on the trace direction used to calculate the nearest neighbor point.

Concretely, in case the nearest neighbor point is obtained in the first trace direction, the relation minutia features calculation part 212 assumes that a child minutia exists in the same direction as the feature point direction of the parent minutia, and sets a feature "FORWARD" as the child minutia relative direction. On the other hand, in case the nearest neighbor point is obtained in the second trace direction, the relation minutia features calculation part 212 assumes that the child minutia exists in the opposite direction to the minutia direction of the parent minutia, and sets a feature "BACKWARD" (opposite direction) as the child minutia relative direction.

In step S106, the relation minutia features calculation part 212 sets a straight line between the nearest neighbor point and the child minutia, and calculates the number of intersections of the straight line with the skeleton, which becomes a value of "contour skeleton count".

In step S107, the relation minutia features calculation part 212 determines whether the calculated contour skeleton count is 1 or more.

If the contour skeleton count is "1" or more (in step S107, "YES" branch), the relation minutia features calculation part 212 operates the process of step S108. If the contour skeleton count is "0" (in step S107, "NO" branch), the relation minutia features calculation part 212 operates the process of step S109 and following steps.

In step S108, the relation minutia features calculation part 212 the minutia feature related to "child minutia relative position". As explained above, the relation minutia features calculation part 212 sets the nearest neighbor point to the origin of the XY coordinate axis and the direction of the ridge line direction trace to the positive direction of the Y axis, and determines the "child minutia relative position" according to the quadrant in which the child minutia exists.

Figure 16:
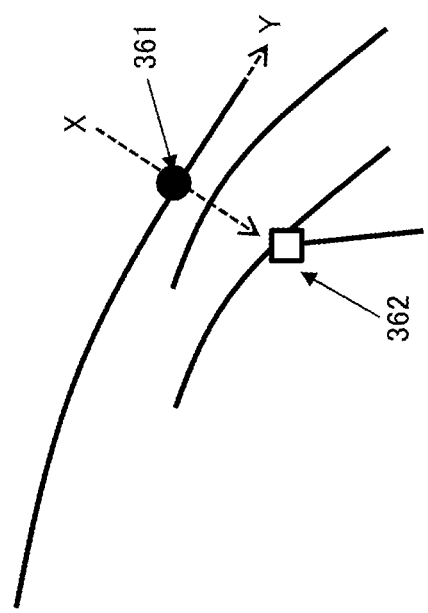
FIG. 16 shows a diagram explaining calculation of a child minutia relative position.

Referring to FIG. 16, for example, in the XY coordinate system in which the nearest neighbor point 361 is the origin and the direction of the ridge line direction tracing is the positive direction of the Y axis, the child minutia 362 is located in a first quadrant, so the child minutia relative position related to the minutia 362 is "RIGHT".

As explained above, in case the contour skeleton count is "0" (in step S107, "NO" branch), the relation minutia features calculation part 212 operates the processes of step S109 and following steps.

In step S109, the relation minutia features calculation part 212 determines whether or not the parent minutia and the child minutia are directly connected by one or more skeleton.

In case the parent minutia and the child minutia are not directly connected by one or more skeleton (in step S107, "NO" branch), the relation minutia features calculation part 212 terminates the process.

In case the parent minutia and the child minutia are directly connected by one or more skeletons (in step S107, "YES" branch), the relation minutia features calculation part 212 operates the process of step S110.

In step S110, the relation minutia features calculation part 212 starts the connection type calculation part 213. Concretely, the relation minutia features calculation part 212 notifies the connection type calculation part 213 of information (identifier or coordinate position for identifying the minutiae) regarding the parent minutia and the child minutia whose contour skeleton count is "0", and instruct to start the calculation of "connection type". Details regarding the calculation of the "connection type" by the connection type calculation part 213 will be described later. Here, in case the contour skeleton count is "0", since the distance between the nearest neighbor point and the child minutia is short, and the child minutia relative position is opted to vary, it is preferred to set the child minutia relative position feature of the child minutia as "UNKNOWN". Also, in case the nearest neighbor point and the child minutia match, since the child minutia relative position cannot be calculated, the feature concerned becomes "UNKNOWN".

Next, the calculation of the relation minutia features by the relation minutia features calculation part 212 will be concretely described with reference to the figures. Here, the calculation of the relation minutia features, in case the minutia 301 shown in FIG. 8(a) is the parent minutia and the minutia 304 is the child minutia, will be described.

Figure 17:
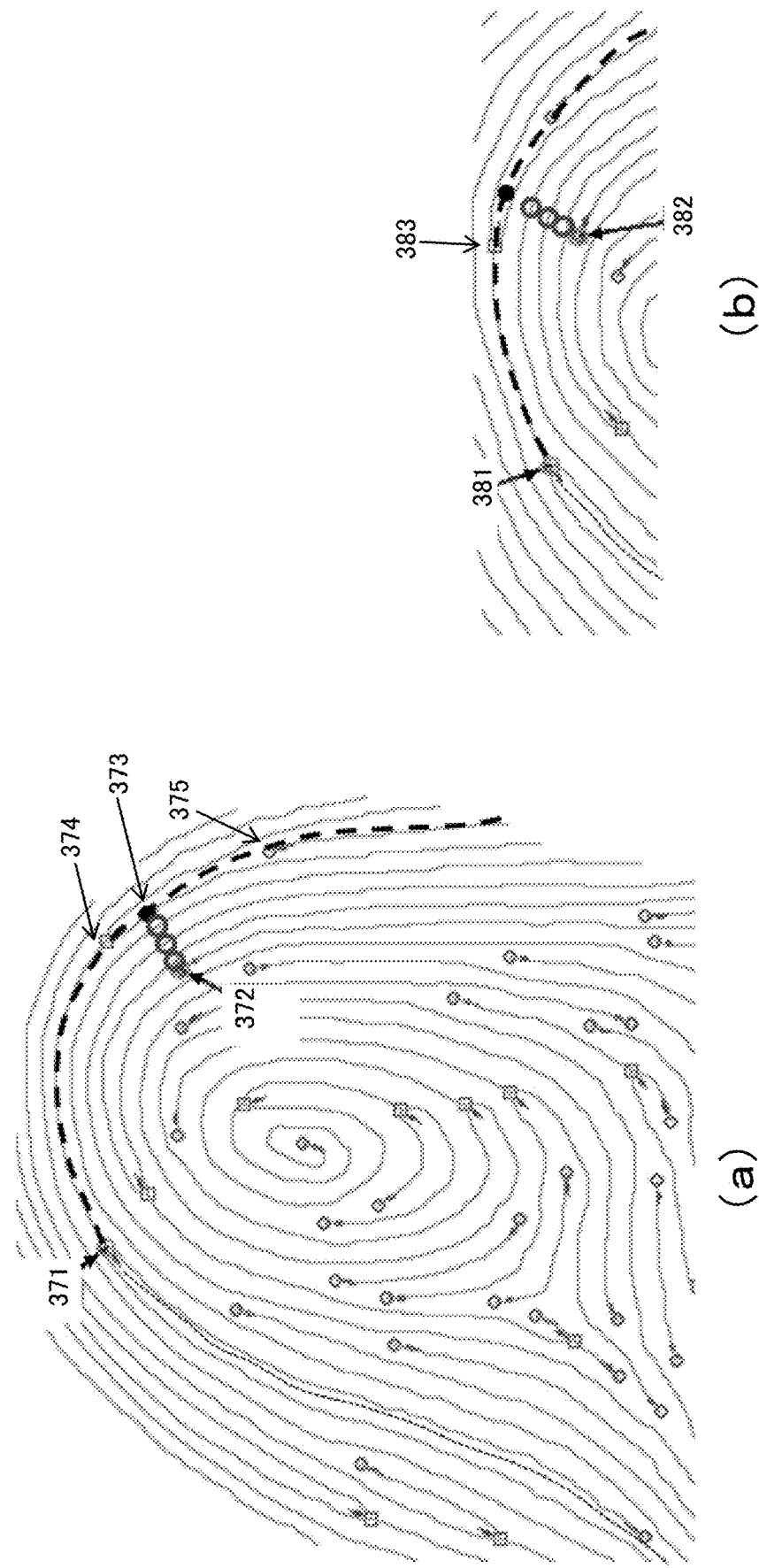
FIG. 17 shows a diagram explaining calculation of a relation minutia feature(s).

Referring to FIG. 17A, since the minutia direction of a parent minutia 371 (minutia 301) is toward lower left direction, the first trace direction is the lower left direction, and the second trace direction is toward upper right direction. When the ridge line direction tracing is performed in the first trace direction (shown by a thin dotted line), the distance between the trace point and the child minutia 372 (minutia 304) is increasing and increasing, so that the first nearest candidate point is the same position as the parent minutia 371.

Next, when the ridge line direction tracing is performed in the second trace direction (shown by a thick dotted line), the position of the black point in the figure is calculated as a position whose distance from the child minutia 372 is the shortest. Thus, the second nearest candidate point is the black point in the figure.

Comparing a distance between the first nearest neighbor candidate point (parent minutia 371) and the child minutia 372 and a distance between the second nearest neighbor candidate point (black point) and the child minutia 372, the latter is shorter, so that the black point becomes the nearest neighbor point 373. Since the nearest neighbor point 373 is obtained by the second trace direction, the "child minutia relative direction" regarding the child minutia 372 becomes "BACKWARD".

Further, since the number of skeletons intersecting with a straight line connecting the nearest neighbor point 373 and the child minutia 372 is "3", the contour skeleton count related to the child minutia 372 becomes "3".

Note that skeleton lines that are not from true ridge lines may appear in the skeleton image due to noise (for example, incipient ridges). In order to eliminate the influence of such noise, it is preferred to take measures such as not to add (count) skeleton(s) existing within a predetermined distance from the nearest neighbor point.

Also, as for the child minutia relative position with respect to the child minutia 372, as shown in the example of FIG. 17(a), if the positive direction of the Y axis is set as the ridge line direction trace at the nearest neighbor point 373, the child minutia 372 exists in the fourth quadrant, resulting in that the child minutia relative position related to the child minutia 372 becomes "RIGHT".

Here, in the fingerprint image in FIG. 17(a) is related to the fingerprint image (impressed fingerprint) in FIG. 8(a). Also, for the fingerprint image (latent fingerprint) shown in FIG. 8(b), the relation minutia features are similarly calculated by the matching apparatus 30 (see FIG. 17(b)).

Referring to FIG. 17(b), the contour skeleton count of the parent minutia 381 relating to the child minutia 382 is "3", the child minutia relative direction is "BACKWARD", and the child minutia relative position is "RIGHT". The "relation minutia features" calculated from the impressed fingerprint and the latent fingerprint are the same, which means the relation minutia features are not affected by image distortion.

Here, confirming with the FIG. 17(a), since the parent minutia 371 and the child minutia 374 (minutia 305) on the fingerprint exists on the same skeleton, the "contour skeleton count" related to the child minutia 374 becomes "0". Similarly, confirming with FIG. 17(b), since the parent minutia 381 and the child minutia 383 on the latent fingerprint exist on the same skeleton, the "contour skeleton count" related to the child minutia 383 also becomes "0". As described above, in case the contour skeleton count is "0", the child minutia relative position of the child minutia is not calculated (set to UNKNOWN).

The relation minutia features calculation part 212 repeats the above described processing for each element of configured child minutiae, and calculates the relation minutia features of the child minutia related to one parent minutia (child minutia relative direction, child minutia relative position, contour skeleton count). Also, the relation minutia features calculation part 212 repeats the above processing by switching the parent minutia to another minutia, and calculates the relation minutia features related to the minutiae in the fingerprint image.

For example, the relation minutia features calculation part 212 calculates information as shown in FIG. 18 as the relation minutia features.

Note that, in disclosure of the present application, the skeleton and the ridge line can be treated also as synonymous. In particular, with respect to the "relation minutia features", the skeleton and the ridge line can be treated as synonymous. For example, the relation minutia features calculation part 212 calculates the number of ridge lines existing between the child minutia and the nearest neighbor point, and may calculate the "contour ridge line count" as a minutia feature instead of the "contour skeleton count".

Next, explanation on the connection type calculation part 213 follows.

The connection type calculation part 213 is started in case the contour skeleton count is calculated as "0" in the calculation of the relation minutia features, and the parent minutia and the child minutia are directly connected by one or more skeletons. Note that the fact that the parent minutia and the child minutia are directly connected by one or more skeletons represents that no other minutia exists between the parent minutia and the child minutia. In other words, in case another minutia exists between the minutia and the child minutia on the same skeleton, the connection type for the child minutia concerned is not calculated. Further, in case the child minutia exists on the trace line obtained by the ridge line direction tracing, the "contour skeleton count" for the child minutia concerned is "0". Even in this case, in case the child minutia exists on the skeleton where the parent minutia exists and is not directly connected [to the parent minutia], the child minutia is not subject to the connection type calculation. As for an example shown in FIG. 17, although a child minutia 375 exists on the trace line (thick dotted line) of the parent minutia 371, the child minutia 375 is not directly connected to the skeleton of the parent minutia 371, so that it is not subject to the connection type calculation.

Figure 19:
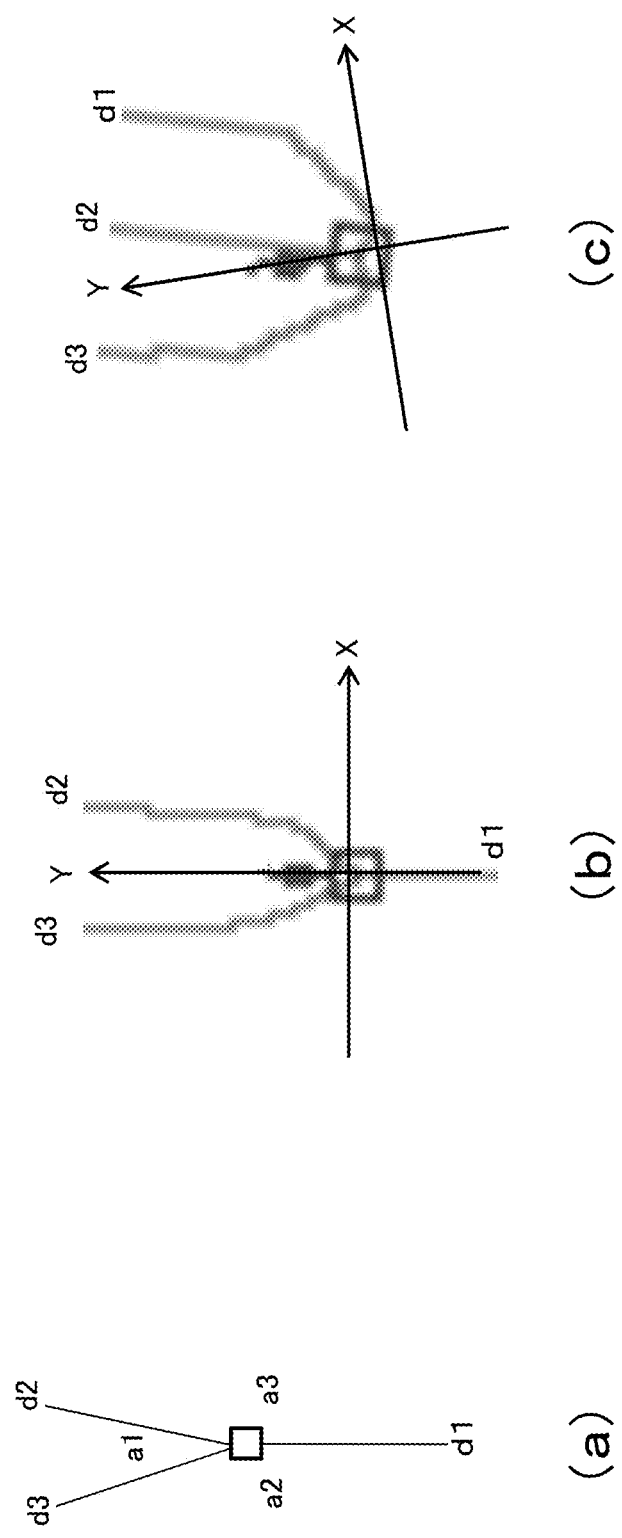
FIG. 19 is a diagram showing an operation of a calculation part of connection type according to the first exemplary embodiment.

Prior to explaining the detailed operation of the connection type calculation part 213, definition is given to the three skeletons configuring the bifurcation point. As described with reference to FIG. 10, in case the minutia is a bifurcation point, three inner angles can be defined. Concretely, as shown in FIG. 19(*a*), three inner angles a1, a2, and a3 are obtained from the three skeletons forming the bifurcation point. Among the three inner angles, following explanation is given provided that the minimum inner angle is a1. Also, among three skeletons that form the bifurcation point, a skeleton not related to the minimum inner angle a1 (do not form inner angle a1; is not in contact to inner angle a1) is denoted as d1, the skeleton not related to the inner angle a2 as d2, and the skeleton not related to the inner angle a3 as d3. Further, as explained above, in case the minutia is the bifurcation point, the minutia direction (bifurcation point direction) is a direction that bisects the minimum inner angle a1 formed by the skeletons d2 and d3.

In addition, a two-dimensional coordinate system is configured in which the minutia position is set as the origin and the minutia direction is set as the positive Y-axis direction, and the direction is expressed by unit of 360 degrees (Ref. FIG. 19(*b*)). In the normal region of the fingerprint image excluding the vicinity of the core region and the like, the skeleton d2 is located between 0 degrees and less than 90 degrees (first quadrant) in the configured two-dimensional coordinate system. In the following explanation, the skeleton d2 located in the first quadrant of the configured two-dimensional coordinate system is denoted as a right skeleton. Also, the skeleton d3 is normally located between 90 degrees and less than 180 degrees (second quadrant). Thus, the skeleton d3 located in the second quadrant of the configured two-dimensional coordinate system is denoted as a left skeleton. Further, the skeleton d1 is normally located between 180 degrees and less than 360 degrees (third and fourth quadrants). Thus, the skeleton d1 located in third and fourth quadrants of the configured two-dimensional coordinate system is expressed as an opposite side skeleton.

Further, in a region different from the normal region, such as the vicinity of the core region, a special skeleton form as shown in FIG. 19(*c*) may appear instead of the skeleton form as shown in FIG. 19(*b*). As shown in FIG. 19(*c*), in case the skeleton d1 is located in the first quadrant or second quadrant (between 0 degrees or more and less than 180 degrees) of configured two-dimensional coordinate system, the skeleton d1 is expressed as a special opposite side skeleton.

In the two-dimensional coordinate system as shown in FIG. 19(*b*) and FIG. 19(*c*), the minutia direction is always approximately 90 degrees.

Figure 20:
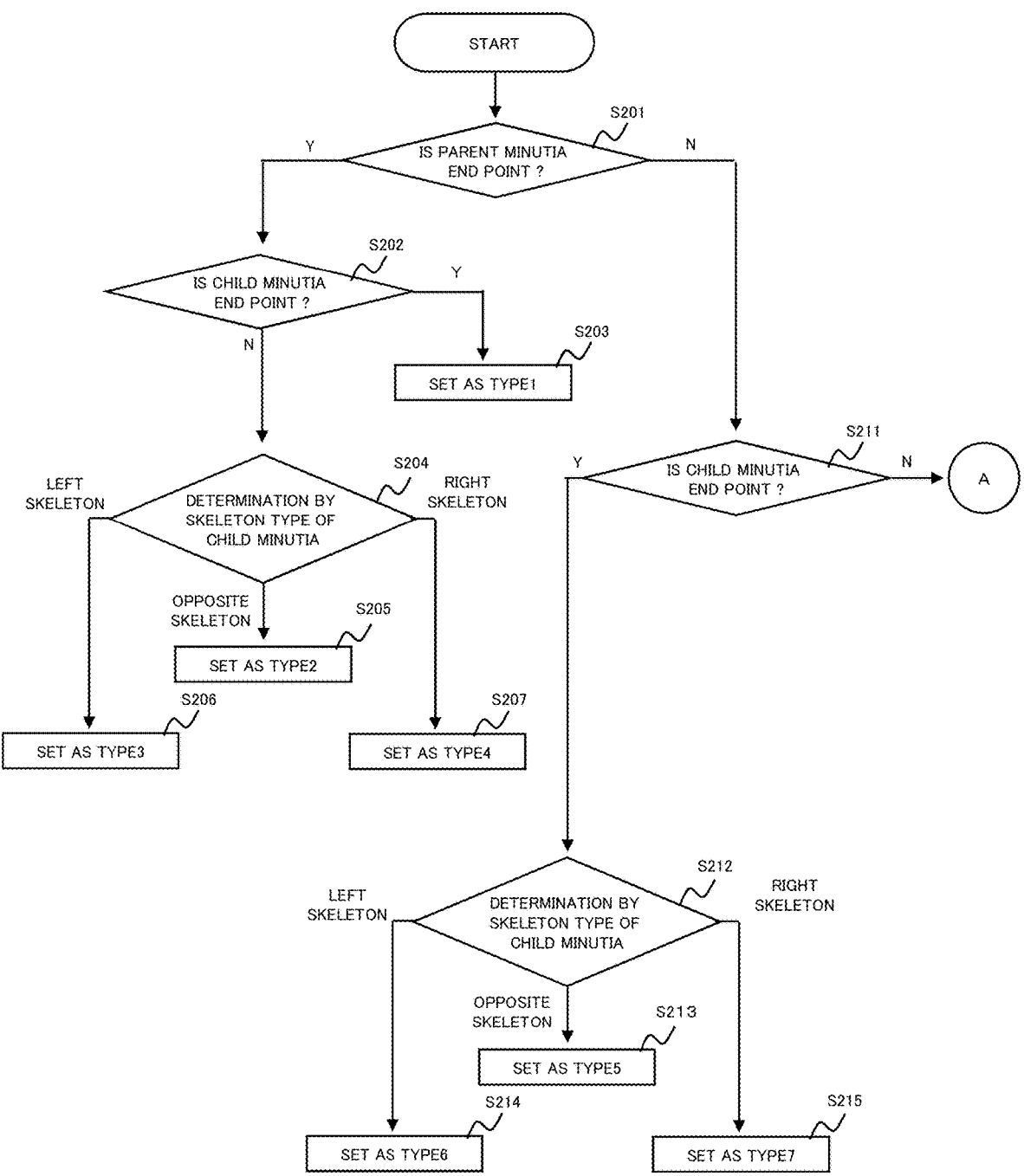
FIG. 20 is a flowchart showing an example of operations of the calculation part to calculate a connection type according to the first exemplary embodiment.
Figure 21:
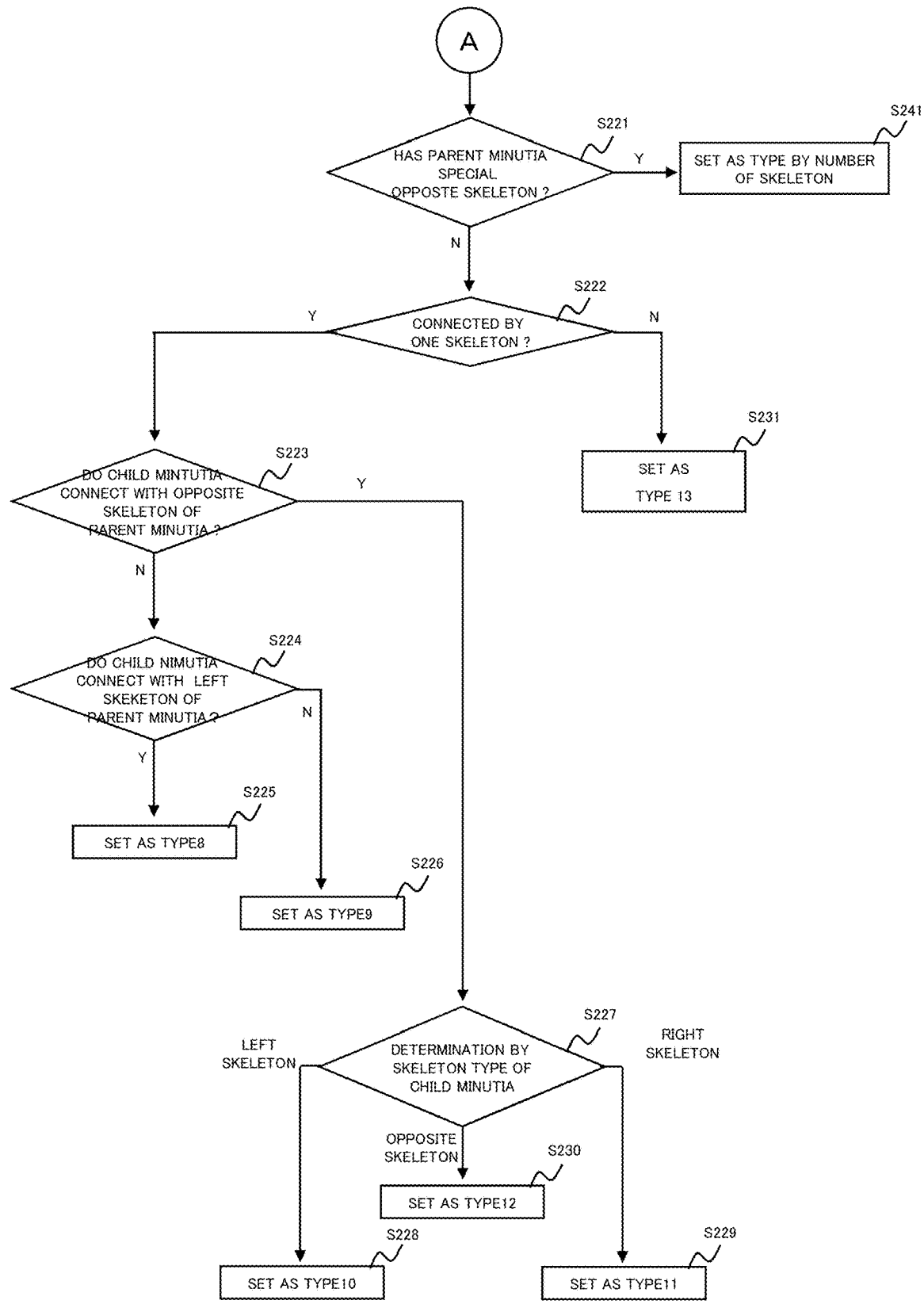
FIG. 21 is a flowchart showing an example of operations of the calculation part to calculate the connection type according to the first exemplary embodiment.

FIG. 20 and FIG. 21 are a flowchart showing an example of operation of the connection type calculation part 213.

The connection type calculation part 213 determines the connection type, based on the direction and type of each of the parent minutia and the child minutia, and the number of skeletons connecting these minutiae, and based on the type of the skeleton, which is, in case the type of at least one of the parent minutia and the child minutia is the bifurcation point, the one connected to the other minutia among the three skeletons forming the bifurcation point concerned. In more detail, the connection type calculation part 213 determines the type of each of the three skeletons (the right skeleton, the left skeleton, the opposite skeleton, and the special opposite skeleton) according to any quadrant in which each of the three skeletons forming the bifurcation point exists, in the coordinate system described with reference to FIG. 19 (the two-dimensional coordinate system in which the position of the bifurcation is set as the origin and the minutia direction featuring the bifurcation point is set as the Y axis positive direction), and make use of it for the calculation of the connection type.

First, the connection type calculation part 213 determines the type of the parent minutia (step S201).

In case the parent minutia is the end point (in step S201, YES branch), the processings of step S202 et seq. are to be executed. In case the parent minutia is the bifurcation point (in step S201, NO branch), the processings of step S211 et seq. are to be executed.

In step S202, the connection type calculation part 213 determines the type of child minutia.

Figure 22:
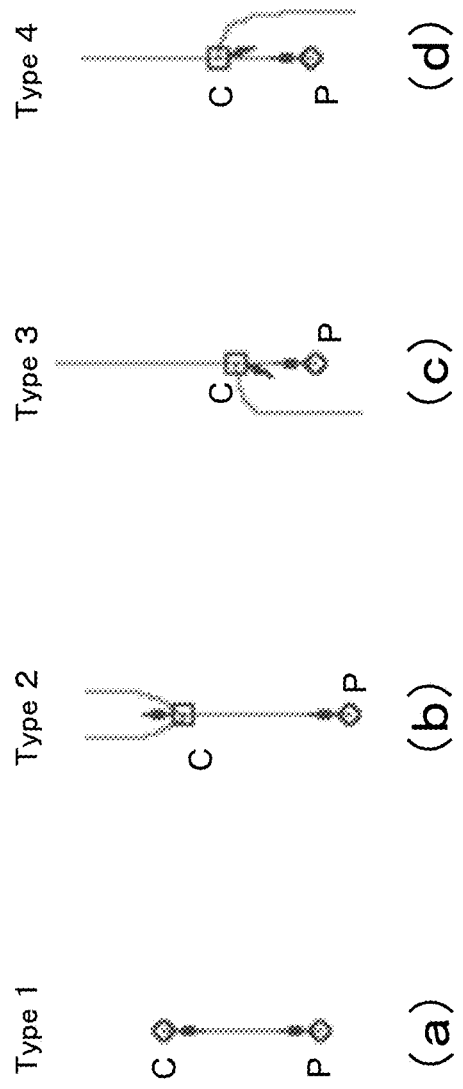
FIG. 22 shows a diagram explaining connection types.

In case the child minutia is the end point (in step S202, YES branch), the connection type calculation part 213 sets the connection type of the child minutia to "TYPE1" (step S203). For example, the connection type as shown in FIG. 22(*a*) corresponds to "TYPE1". Hereinafter, in the explanation on FIG. 22 et seq., the parent minutia is denoted as P, and the child minutia is denoted as C.

In case the child minutia is the bifurcation point (step S202, NO branch), the connection type calculation part 213 determines what type of the skeleton is connected to the parent minutia among the three skeletons that form child minutia (bifurcation point) (step S204).

In case the parent minutia is connected to the opposite side skeleton(s) of the child minutia (bifurcation point), the connection type calculation part 213 sets the connection type of the child minutia to "TYPE2" (step S205). For example, the connection type as shown in FIG. 22(b) corresponds to "TYPE2".

In case the parent minutia is connected to a left side skeleton of the child minutia (bifurcation point), the connection type calculation part 213 sets the connection type of the child minutia to "TYPE3" (step S206). For example, the connection type as shown in FIG. 22(c) corresponds to "TYPE3".

In case the parent minutia is connected to a right side skeleton of the child minutia (bifurcation point), the connection type calculation part 213 sets the connection type of the child minutia to "TYPE4" (step S207). For example, the connection type as shown in FIG. 22(d) corresponds to "TYPE4".

As described above, in case the parent minutia is the bifurcation point (step S201, NO branch), processes of S211 et seq. are to be executed.

In step S211, the connection type calculation part 213 determines the type of the child minutia.

In case the child minutia is the end point (step S211, YES branch), the connection type calculation part 213 determines what type of the skeleton is connected to the child minutia among the three skeletons that form parent minutia (bifurcation point) (step S212).

Figure 23:
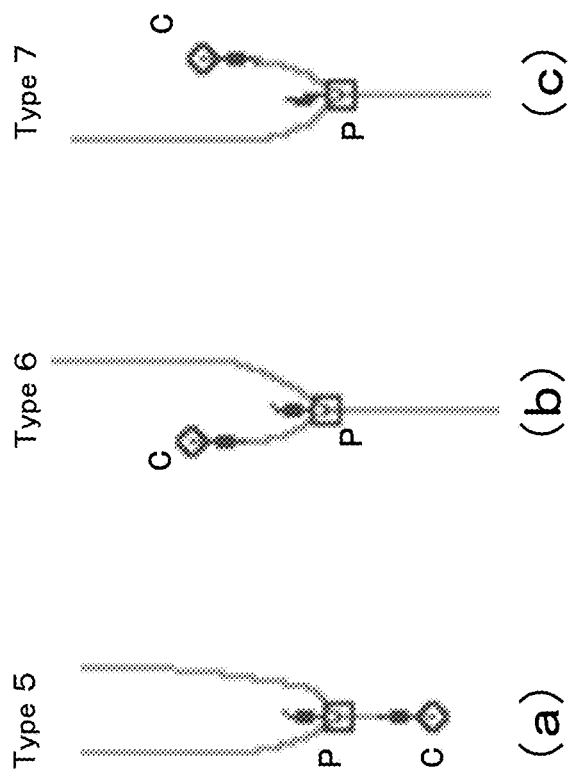
FIG. 23 shows a diagram explaining connection types.

In case the child minutia is connected to the opposite side skeleton of the parent minutia (bifurcation point), the connection type calculation part 213 sets the connection type of the child minutia to "TYPE5" (step S213). For example, the connection type as shown in FIG. 23(a) corresponds to "TYPE5".

In case the child minutia is connected to the left side skeleton of the parent minutia (bifurcation point), the connection type calculation part 213 sets the connection type of the child minutia to "TYPE6" (step S214). For example, the connection type as shown in FIG. 23(b) corresponds to "TYPE6".

In case the child minutia is connected to the right side skeleton of the parent minutia (bifurcation point), the connection type calculation part 213 sets the connection type of the child minutia to "TYPE7" (step S215). For example, the connection type as shown in FIG. 23(c) corresponds to "TYPE7".

In case the type of the child minutia is the bifurcation point (step S211, NO branch), processes of S221 et seq. are to be executed.

The explanation will be made by referring to FIG. 21, on processes of step S221 et seq.

In step S221, the connection type calculation part 213 determines whether the parent minutia has the special opposite skeleton.

In case the parent minutia does not have the special opposite skeleton (step S221, NO branch), processes of the step S222 et seq. are to be executed. In case the parent minutia has the special opposite skeleton (step S221, YES branch), step S241 is to be executed.

In step S222, the connection type calculation part 213 determines whether the parent minutia is connected to the minutia by one skeleton, or by two skeletons.

In case the parent minutia is connected to the minutia by one skeleton (step S222, YES branch), the connection type calculation part 213 determines whether the child minutia (bifurcation point) is connected to the parent minutia by the opposite skeleton (step S223).

In case the child minutia is not connected to parent minutia by the opposite skeleton (step S223, NO branch), the connection type calculation part 213 determines whether the child minutia is connected to the parent minutia (bifurcation point) by the left skeleton (step S224).

In case the child minutia is connected to the parent minutia by the left side skeleton (step S224, YES branch), the connection type calculation part 213 sets the connection type of the child minutia to "TYPE8" (step S225). For example, two connection types as shown in FIG. 24(a) corresponds to "TYPE8".

In case the child minutia is connected to the parent minutia by the right side skeleton (step S224, NO branch), the connection type calculation part 213 sets the connection type of the child minutia to "TYPE9" (step S226). For example, two connection types as shown in FIG. 24(b) corresponds to "TYPE9".

In case the child minutia is connected to parent minutia by the opposite side skeleton (step S223, YES branch), the connection type calculation part 213 determines what type of the skeleton is connected to the parent minutia among the three skeletons that form the child minutia (bifurcation point) (step S227).

In case the parent minutia is connected to the left side skeleton of the child minutia (bifurcation point), the connection type calculation part 213 sets the connection type of the child minutia to "TYPE10" (step S228). For example, the connection type as shown in FIG. 25(a) corresponds to "TYPE10".

In case the parent minutia is connected to the right side skeleton of the child minutia (bifurcation point), the connection type calculation part 213 sets the connection type of the child minutia to "TYPE11" (step S229). For example, the connection type as shown in FIG. 25(b) corresponds to "TYPE11".

In case the parent minutia is connected to the opposite side skeleton of the child minutia (bifurcation point), the connection type calculation part 213 sets the connection type of the child minutia to "TYPE12" (step S230). For example, the connection type as shown in FIG. 25(c) corresponds to "TYPE12".

In case the parent minutia is connected to two skeletons of the child minutia (step S222, NO branch), the connection type calculation part 213 sets the connection type of the child minutia to "TYPE13" (step S231). For example, the connection type as shown in FIG. 25(d) corresponds to "TYPE13".

As described above, in case parent minutia has the special opposite skeleton (step S221, YES branch), process of S241 is to be executed.

In step S241, the connection type calculation part 213 determines the connection type of the child minutia based on the count (number) of the skeletons connecting two minutiae.

In case the parent minutia is connected to the child minutia by one skeleton, the connection type calculation part 213 sets the connection type of the child minutia to "TYPE14". For example, the connection type as shown in FIG. 26(a) corresponds to "TYPE14".

In case the parent minutia is connected to the child minutia by two skeletons, the connection type calculation part 213 sets the connection type of the child minutia to "TYPE15". For example, the connection type as shown in FIG. 26(b) corresponds to "TYPE15".

In case the parent minutia is connected to the child minutia by three skeletons, the connection type calculation part 213 sets the connection type of the child minutia to "TYPE16". For example, the connection type as shown in FIG. 26(c) corresponds to "TYPE16".

In the example described above in FIG. 17(a), in case the minutia 301 is set as the parent minutia 371 and the minutia 305 is set as the child minutia 374, respectively, the contour skeleton count of the child minutia 374 becomes "0". Thus, the connection type between the parent minutia 371 and the child minutia 374 is to be determined.

In this case, the parent minutia 371 is the bifurcation point (step S201, YES branch), and the child minutia 374 is also the bifurcation point (step S221, NO branch). Also, the parent minutia does not have the special opposite skeleton (step S221, NO branch), and two minutiae are connected by one skeleton (step S222, YES branch). Further, the child minutia 374 is connected to the opposite side skeleton of the parent minutia 371 (step S223, YES branch), and the parent minutia is connected to the opposite side skeleton of the child minutia. Thus, the connection type between the parent minutia 371 and the child minutia 374 is determined as "TYPE12" (step 230).

As explained above, the connection type calculation part 213 determines the type of connection, based on the type of minutia (parent minutia, child minutia), the type of skeleton forming the bifurcation point (left side skeleton, right side skeleton, opposite side skeleton, special opposite skeleton), and the count of the skeleton connecting between the parent minutia and the child minutia. However, the connection type calculation part 213 may not only determine the connection type based on the type of the skeleton etc., but also determine based on the position, the minutia direction, and the type of each of the parent minutia and the child minutia (that is, the basic minutia features), and the number of skeleton(s) connecting two minutiae.

Figure 27:
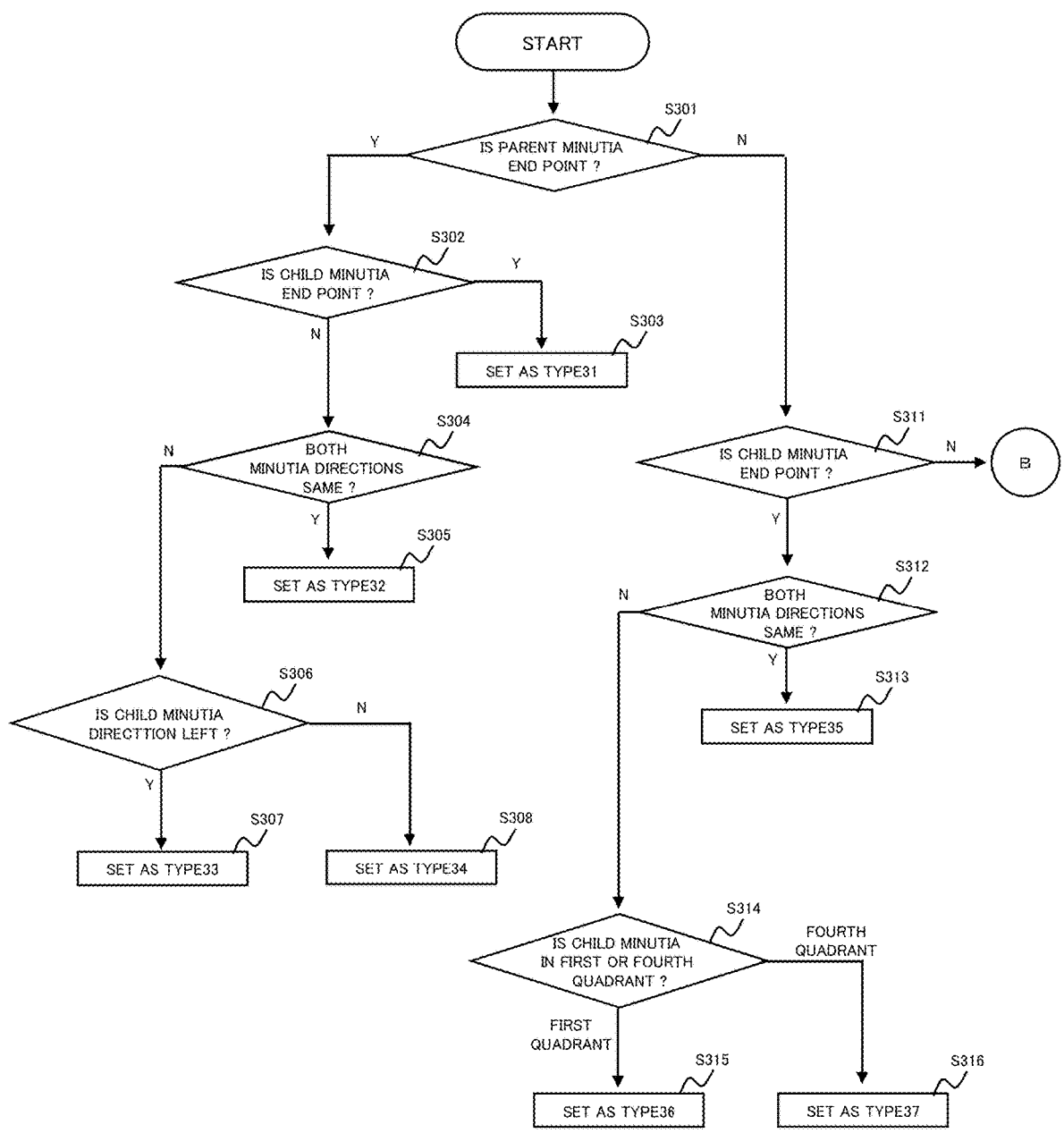
FIG. 27 is a flowchart showing an example of other operation of a calculation part to calculate the connection type according to the first exemplary embodiment.
Figure 28:
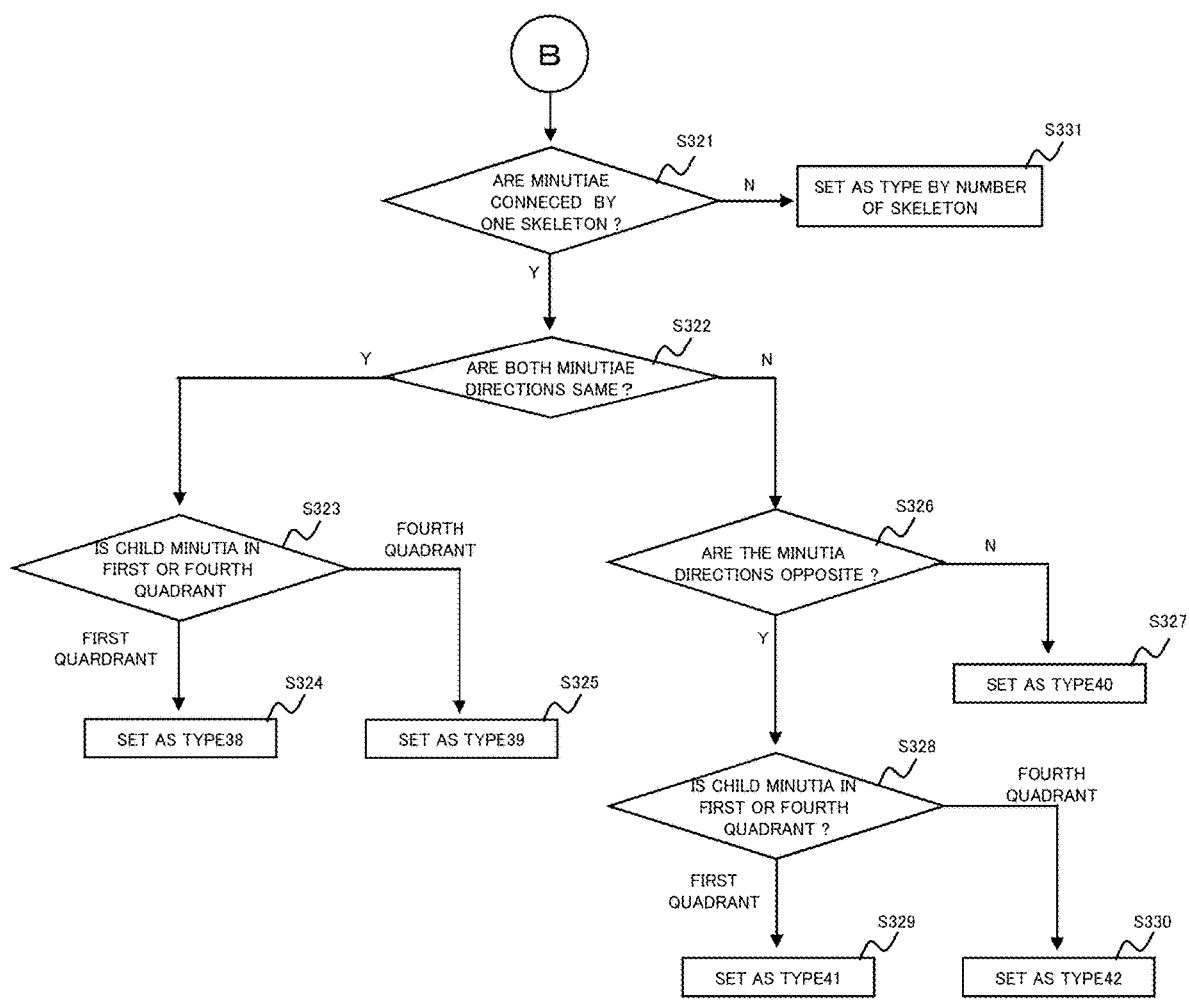
FIG. 28 is a flowchart showing an example of other operations of the calculation part to calculate the connection type according to the first exemplary embodiment.

FIG. 27 and FIG. 28 show an example of other operation of the connection type calculation part 213.

First, the connection type calculation part 213 determines the type of the parent minutia (step S301).

In case the parent minutia is the end point (step S301, YES branch), processes of step S302 et seq. are to be executed. In case the parent minutia is the bifurcation point (step S301, NO branch), processes of step S311 et seq. are to be executed.

In step S302, the connection type calculation part 213 determines the type of the child minutia.

In case the child minutia is the end point (step S302, YES branch), the connection type calculation part 213 sets the connection type of the child minutia to "TYPE31" (step S303). For example, the connection type as shown in FIG. 22(a) corresponds to "TYPE31".

In case the child minutia is the bifurcation point (step S302, NO branch), the connection type calculation part 213 determines whether the minutia direction of the parent minutia is the same as the minutia direction of the child minutia (step S304). Note that, the determination whether or not the minutiae directions are the same is determined as follows. That is, in case the angle difference A between the two minutia directions is within a predetermined range (0 degrees≤Δ≤90 degrees, −90 degrees≤Δ<0 degrees) the directions are the same, and in case out of the predetermined range (90 degrees<Δ≤180 degrees, −90 degrees<Δ<180 degrees) the directions are the opposite.

In case two minutia directions are the same (step S304, YES branch), the connection type calculation part 213 sets the connection type of the child minutia to "TYPE32" (step S305). For example, the connection type as shown in FIG. 22(b) correspondents to "TYPE32".

In case two minutia directions are the opposite (step S304, NO branch), the connection type calculation part 213 determines whether the minutia direction of the child minutia is directed to left side (first quadrant) or right side (fourth quadrant) as seen from the minutia direction of the parent minutia (step S306).

In case directed to left side (step S306, YES branch), the connection type calculation part 213 sets the connection type of the child minutia to "TYPE33" (step S307). For example, the connection type as shown in FIG. 22(c) corresponds to "TYPE33".

In case directed to right side (step S306, NO branch), the connection type calculation part 213 sets the connection type of the child minutia to "TYPE34" (step S308). For example, the connection type as shown in FIG. 22(d) corresponds to "TYPE34".

As described above, in case the parent minutia is the bifurcation point (step S301, NO branch), processes of step S311 et seq. are to be executed.

In step S311, the connection type calculation part 213 determines the type of child minutia.

In case the type of the child minutia is the end point (step S311, YES branch), the connection type calculation part 213 determines whether the minutia direction of the parent minutia is the same as the minutia direction of the child minutia (step S312). In case the minutia directions are the same direction (step S312, YES branch), the connection type calculation part 213 sets the connection type of the child minutia to "TYPE35" (step S313). For example, the connection type as shown in FIG. 23(a) corresponds to "TYPE35".

In case the minutia directions are the opposite direction (step S312, NO branch), the connection type calculation part 213 determines whether the child minutia is located in first quadrant or fourth quadrant, when configured the XY coordinate system as the parent minutia being the origin and the minutia direction of the parent minutia is the positive direction of the X axis (step S314). In case the child minutia is located in the first quadrant (that is, exists on the left side seen from the parent minutia), the connection type calculation part 213 sets the connection type of the child minutia to "TYPE36" (step S315). For example, the connection type as shown in FIG. 23(b) corresponds to "TYPE36".

In case the child minutia is located in the fourth quadrant (that is, exists right side seen from the parent minutia), the connection type calculation part 213 sets the connection type of the child minutia to "TYPE37" (step S316). For example, the connection type as shown in FIG. 23(c) corresponds to "TYPE37".

In case the type of the child minutia is the bifurcation point (step S311, NO branch), processes of step S321 et seq. are to be executed.

The explanation will be made by referring to FIG. 28, on processes of step S321 et seq.

In step S321, the connection type calculation part 213 determines whether the parent minutia and the child minutia are connected by one skeleton.

In case the parent minutia and the child minutia are connected by one skeleton (step S321, YES branch), the connection type calculation part 213 determines whether the minutia direction of the parent minutia is the same as the minutia direction of the child minutia (step S322).

In case the two minutia directions are the same (step S322, YES branch), the connection type calculation part 213 determines whether the child minutia is located in the first quadrant or fourth quadrant, when configured the XY coordinate system as the parent minutia being the origin and the minutia direction of the parent minutia is set as the positive direction of the X axis (step S323).

In case the child minutia is located in first quadrant (that is, exists on the left side seen from the parent minutia), the connection type calculation part 213 sets the connection type of the child minutia to "TYPE38" (step S324). For example, the connection type as shown in FIG. 24(a) corresponds to "TYPE38".

In case the child minutia is located in fourth quadrant (that is, exists on the right side seen from the parent minutia), the connection type calculation part 213 sets the connection type of the child minutia to "TYPE39" (step S325). For example, the connection type as shown in FIG. 24(b) corresponds to "TYPE39".

In case two minutia directions are the opposite (step S322, NO branch), the connection type calculation part 213 determines whether or not two minutia directions are opposite (step S326). Note that the determination on whether or not two minutiae are opposite can be found by the following. For example, when the parent minutia is set as the origin of the XY coordinate system and the minutia direction of the parent minutia is set as the positive direction of the Y axis, by shifting the child minutia parallel to the X axis direction, find whether or not child minutia can be shifted to the positive Y-axis in the positive region.

In case two minutia directions are not opposite (step S326, NO branch), the connection type calculation part 213 sets the connection type of the child minutia to "TYPE40" (step S327). For example, the connection type as shown in FIG. 25(c) corresponds to "TYPE40".

In case two minutia directions are opposite (step S326, YES branch), the connection type calculation part 213 determines existing quadrant of child minutia, by setting the parent minutia being the origin of the XY coordinate system and by setting the minutia direction of the parent minutia as the positive direction of the Y axis, as the location of child minutia in first quadrant or fourth quadrant (step S328). In case the child minutia is located in first quadrant (that is, exists on the left side seen from the parent minutia), the connection type calculation part 213 sets the connection type of the child minutia to "TYPE41" (step S329). For example, the connection type as shown on the left side of FIG. 24(a) corresponds to "TYPE41".

In case the child minutia is located in fourth quadrant (that is, exists on the right side seen from the parent minutia), the connection type calculation part 213 sets the connection type of the child minutia to "TYPE42" (step S330). For example, the connection type as shown on the left side of FIG. 24(b) corresponds to "TYPE42".

In case the parent minutia and the child minutia are connected by two or more skeletons (step S321, NO branch), the connection type calculation part 213 determines the connection type of child minutia based on the number (count) of skeletons connecting two minutiae (step S331).

Concretely, in case two minutiae are connected by two skeletons, the connection type calculation part 213 sets the connection type of the child minutia to "TYPE43". For example, the connection type as shown in FIG. 25(d) or FIG. 26(b), corresponds to "TYPE43".

In case two minutiae are connected by three skeletons, the connection type calculation part 213 sets the connection type of the child minutia to "TYPE44". For example, the connection type as shown in FIG. 26(c), corresponds to "TYPE44".

In the example of FIG. 17A described above, in case the minutia 301 is set as the parent minutia 371 and the minutia 305 is set as the child minutia 374, the contour skeleton count of the child minutia 374 becomes "0". Therefore, the connection type between the parent minutia 371 and the child minutia 374 is determined.

In this case, the parent minutia 371 is the bifurcation point (step S301, NO branch), and the child minutia 374 is also the bifurcation point (step S311, NO branch). In addition, these minutiae are connected by one skeleton (step S321, YES branch), and the minutia direction is opposite (step S322, NO branch). In addition, two minutiae are not opposite (step S326, NO branch). Thus, the connection type between the parent minutia 371 and the child minutia 374 is determined as "TYPE40".

Here, the connection type calculation part 213 may perform the connection type determination process (determination process using the connection type of the skeleton) according to FIG. 20 and FIG. 21, and the connection type determination process according to FIG. 27 and FIG. 28 (determination process using the positions and minutia directions of each of two minutia) by combination. For example, in the former determination, both of two connection types shown in FIG. 24(a) are determined as "TYPE8". Therefore, in case it is determined as "TYPE8" in the former determination process, the latter determination may be performed to distinguish the two connection types. In more detail, by using the latter determination process, the right side of FIG. 24(a) is determined as "TYPE38" and the left side is determined as "TYPE41".

Hereinabove, the operation of the minutia features calculation part 204 are described.

Returning to FIG. 5, the minutia features output part 205 outputs, to the database 20, various minutia features (basic minutia features, relation minutia features, connection type) calculated by the minutia features calculation part 204 together with the fingerprint image ID information and the fingerprint image. For example, the minutia features output part 205 outputs the minutia features as shown in FIG. 29 to the database 20.

[Matching Apparatus]

Next, a configuration and an operation(s) of the matching apparatus 30 will be explained.

Figure 30:
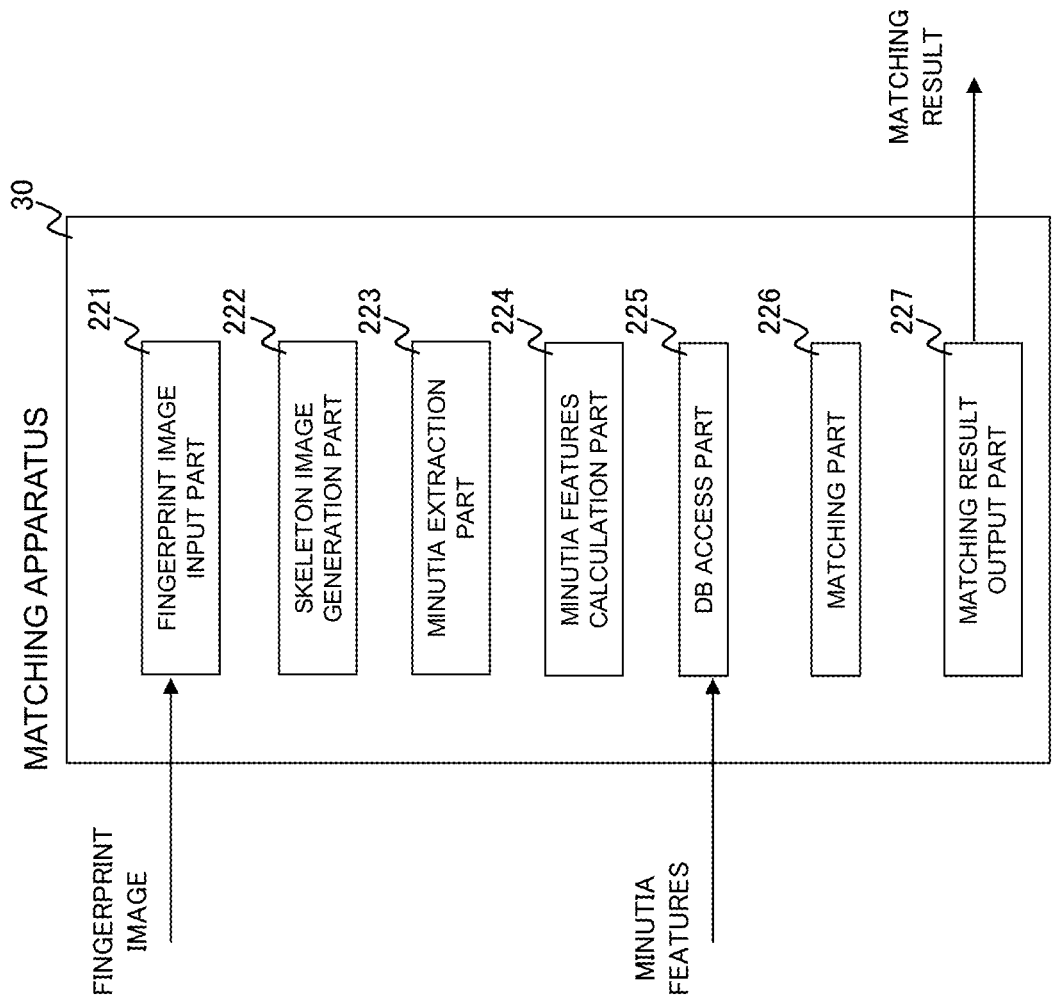
FIG. 30 is a diagram showing an example of process configuration for a matching apparatus according to the first exemplary embodiment.

FIG. 30 is a diagram showing an example of a process configuration of the matching apparatus 30 according to the first exemplary embodiment. By referring to FIG. 30, the matching apparatus 30 is configured, comprising a fingerprint image input part 221, a skeleton image generation part 222, a minutia extraction part 223, a minutia features calculation part 224, a database (DB) access part 225, a matching part 226, and collation result output unit 227.

Since each of the fingerprint image input part 221, the skeleton image generation part 222, the minutia extraction part 223, and the minutia features calculation part 224 can be the same as each of the corresponding processing modules of the minutia features generation apparatus 10, the descriptions thereof are omitted.

As described above, the fingerprint image input to the matching apparatus 30 is assumed to be the fingerprint image (latent fingerprint) as shown in FIG. 30. Also, assume that the matching apparatus 30 operates the minutia features calculation part 224 and the like, and calculates the minutia features as shown in FIG. 31 from the fingerprint image (latent fingerprint) shown in FIG. 3(c).

The database access unit 225 is a means configured to access the database 20 and acquire the fingerprint image, the minutia features, and the ID information stored in the database. Here, it is assumed that the fingerprint image (impressed fingerprint) shown in FIG. 3(a) and the minutia features shown in FIG. 29 are acquired.

The matching part 226 is a means configured to perform matching processing between the input fingerprint image (latent fingerprint) and the fingerprint image (impressed fingerprint) whose minutia features are stored in the database 20.

Figure 32:
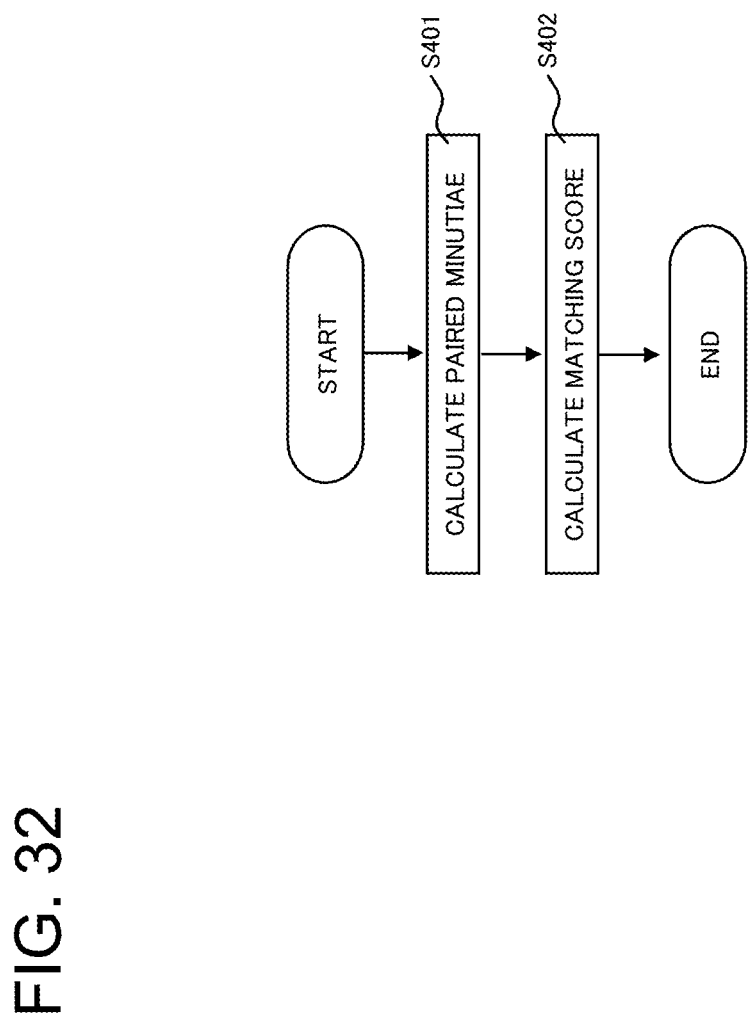
FIG. 32 is a flowchart showing an example of operations of a matching part according to the first exemplary embodiment.

FIG. 32 is a diagram showing an example of an operation of the matching part 226.

First, the matching part 226 calculates a paired minutiae candidate from the minutia included in the search side fingerprint image (latent fingerprint) and the file side fingerprint image (impressed fingerprint) (step S401). Concretely, the matching part 226 performs alignment (positioning) processing of two fingerprint images and converts minutia coordinate(s).

Various methods can be used to align the two fingerprint images. For example, two fingerprint images may be aligned using singular points (core singular point, delta singular points).

In case two minutia coordinates of the search side and the file side are within a predetermined range after the coordinate conversion in the alignment processing, the matching part 226 treats the two minutiae as the paired minutiae candidate. After that, the matching part 226 compares the minutia features of the paired minutiae candidate and performs a final determination (paired minutiae, non-paired minutia).

For example, referring to FIG. 8, the matching part 226 searches the minutia candidate(s) paired with the search side minutia 321 shown in FIG. 8(*b*), from the file side minutiae 301 to 307 shown in FIG. 8(*a*). In the example of FIG. 8, the minutia 301 is calculated as the paired minutia candidate with the minutia 321.

Next, the matching part 226 compares the minutia features of the minutia 321 (the minutia features from the first to fifth line records in FIG. 31) with the minutia features of the minutia 301 (the minutia features from the first to seventh line records in FIG. 29). The matching part 226 determines whether or not these minutiae are the paired minutiae based on the comparison result. Concretely, the matching part 226 compares each element of the minutia features (basic minutia features, relation minutia features, connection type) that feature two minutiae, and increases the matching score in case they match. On the other hand, the matching part 226 lowers the matching score in case there are no minutia features corresponding to the two minutiae, or in case each element of the corresponding minutia features does not match. Alternatively, the matching part 226 may change the matching score(s) by weighting each element.

The matching part 226 performs threshold processing for the matching score(s) calculated as described above, and determines whether or not the two minutiae are the paired minutiae. According to the example of FIG. 29 and FIG. 31, since the search side fingerprint image (latent fingerprint) has only a partial area, the relation minutia features and the like of the child minutia 307 to 317 do not exist in the fingerprint image on the search side (latent fingerprint; FIG. 31). However, since the relation minutia features related to the child minutia 302 to 306 and the child minutiae 322 to 326 corresponding to the child minutia match, the matching score(s) (reliability) of the two minutiae, which are the paired minutiae 311 and 301, are calculated to be high. The minutia 301 and the minutia 321 are determined as the paired minutiae.

Figure 33:
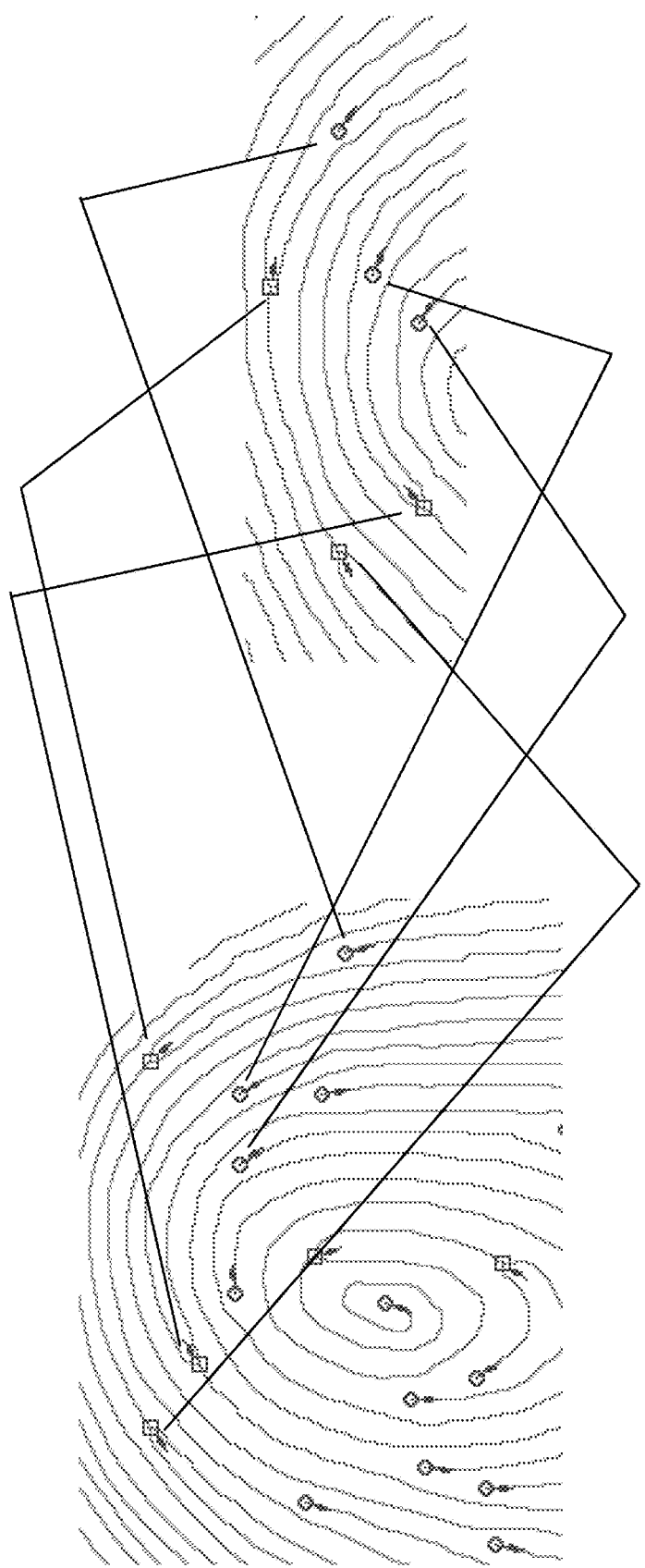
FIG. 33 shows a diagram showing an example of paired minutiae.

By repeating above determination for the other minutiae, the paired minutiae shown in FIG. 33 are calculated out. In FIG. 33, the paired minutiae of the file side (impressed fingerprint; the fingerprint image as shown in FIG. 6(*a*)) and the search side (latent fingerprint; the fingerprint image as shown in FIG. 6(*b*)) are connected by a solid line, explicitly.

After the calculation of the paired minutiae, the matching part 226 calculates the matching score relating to the fingerprint image (subject or target of matching processing performed) acquired from the database 20 (step S402 in FIG. 32). The matching score is an index indicating the similarity (matching degree) between the fingerprint image of the search side (latent fingerprint) and the fingerprint image of the file side (impressed fingerprint).

The matching part 226 also calculates the matching score(s) using the minutia features calculated from each fingerprint image in the calculation of the matching score(s). For example, in case the number of minutiae determined as the paired minutiae is a lot, the matching part 226 increases the matching score of the fingerprint image concerned (file side fingerprint image, impressed fingerprint). Alternatively, in case one fingerprint image has a minutia but the other fingerprint image does not have a corresponding minutia, the matching part 226 lowers the matching score of the fingerprint image.

The matching part 226 repeats such processing for the fingerprint image (impressed fingerprint) acquired from the database 20, and calculates the matching scores for each fingerprint image (impressed fingerprint) on the file side.

The matching result output part 227 selects and outputs fingerprint images having high matching score(s) calculated by the matching part 226 according to a predetermined rule. For example, the matching result output part 227 selects a predetermined number of fingerprint images in descending order of the matching scores. Alternatively, the matching result output part 227 performs threshold processing for the matching scores and selects fingerprint images having a matching score higher than a predetermined value.

The matching result output part 227 outputs a combination of the ID information of the selected fingerprint image and the matching score(s) as the matching result. For example, the matching result output part 227 prints the matching result as shown in FIG. 34, displays it on a monitor, and outputs it to an external storage device such as a USB. Alternatively, the matching result output part 227 may output not only the matching scores but also the minutia features (minutia features as shown in FIG. 29 and FIG. 31) that are the basis (foundation) of the matching score calculation, to external devices (a printer, a monitor, an external storage device, and so on).

Figure 35:
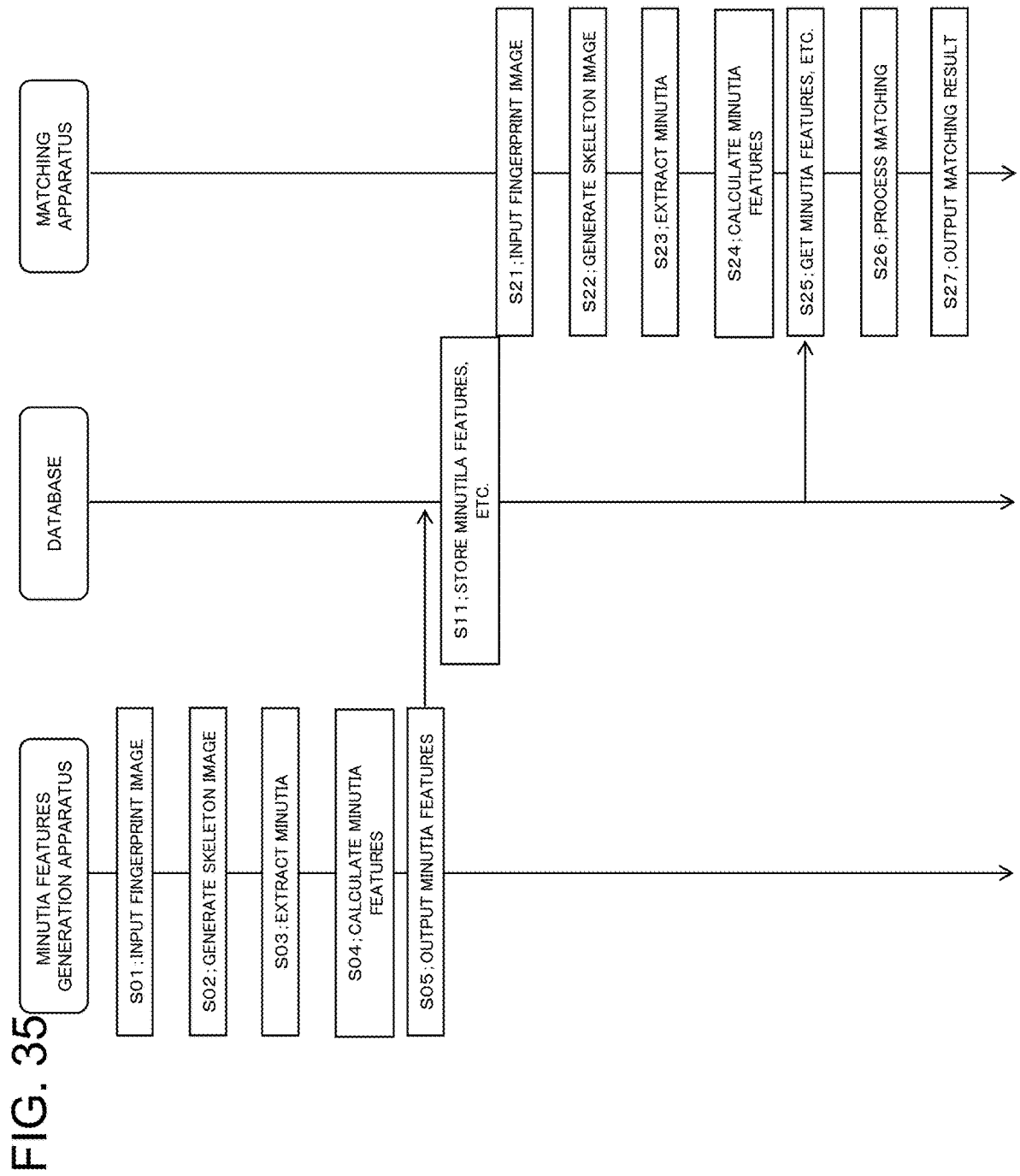
FIG. 35 is a sequence diagram showing an example of operations of the fingerprint matching system according to the first exemplary embodiment.

FIG. 35 is a diagram showing an example of the operation of the fingerprint matching system according to the first exemplary embodiment.

The minutia features generation apparatus 10 inputs a fingerprint image that is a target of minutia features calculation such as an impressed fingerprint (step S01). Then, the minutia features generation apparatus 10 generates a skeleton image from the fingerprint image (step S02), and extracts minutiae (step S03). And the minutia features generation apparatus 10 calculates various minutia features (basic minutia features, relation minutia features, connection type) using the skeleton image and ridge line direction data, and the like (step S04). Thereafter, the minutia features generation apparatus 10 outputs the fingerprint image whose minutia features are calculated, the minutia features of the fingerprint image concerned, and ID information to the database 20 (step S05).

The database 20 stores the minutia features and so on from the minutia features generation apparatus 10 in a storage device (step S11).

The matching apparatus 30 inputs a fingerprint image (latent fingerprint) that is a target of fingerprint matching (step S21). Then, the matching apparatus 30 calculates various minutia features in the same manner as the minutia features generation apparatus 10 (steps S22 to S24). Then the matching apparatus 30 acquires information (the fingerprint image, the minutia features, the ID information) stored in the database 20 (step S25), and performs matching processing (step S26). Then, the matching apparatus 30 outputs the matching results to an external device(s) (step S27).

Note that, the configuration of the fingerprint matching system described in the above embodiment is an example, and is not intended to limit the configuration of the system. For example, the function of the matching apparatus 30 may be incorporated in the minutia features generation apparatus 10. Alternatively, the minutia features generation apparatus 10 may be implemented as a part of the functions of the matching apparatus 30, or the functions of the database 20 may be implemented as a part of the functions of the matching apparatus 30.

Alternatively, the matching apparatus 30 may input two images related to the impressed fingerprint and the latent fingerprint, and match these fingerprint images (a match or a mismatch may be determined).

In the above exemplary embodiment, the contour skeleton count between two minutiae is calculated as the number of skeletons, however, in addition to the contour skeleton count, the conventional ridge line count (number of skeletons) between minutia as disclosed in Non Patent Literature 2 and 3 may also be calculated as a minutia feature and used for the matching processing.

In the above exemplary embodiment, the origin of the XY coordinate system is set at the nearest neighbor point, and the child minutia relative position is calculated. In addition to the minutia feature (or as an alternative), by setting the parent minutia as the origin of the XY coordinate system, minutia features determined by a position, at which the child minutia exists based on the trace direction used upon identifying the nearest neighbor point may be calculated. More concretely, a minutia feature indicating whether the child minutia is located on the right side or the left side on an extension line of the trace direction may be calculated. Concretely, suppose that the parent minutia is set as the origin of the XY coordinate system and the trace direction of the ridge line is set as the positive direction of the X axis, respectively, when the child minutia is located in first quadrant, the feature value of the child minutia becomes "LEFT SIDE", or in case the child minutia is located in fourth quadrant, the minutia feature of the child minutia becomes "RIGHT SIDE".

In the above exemplary embodiment, although the configuration and the operation of the minutia features generation apparatus 10 and the like have been described using the fingerprint image as the image in which the curved stripe pattern is formed by ridge lines, the image to be handled is not limited to the fingerprint image. For example, the minutia features generation apparatus 10 may calculate the minutia features from an image related to a palm-print or the like.

Further, a plurality of steps (processes) are sequentially described in a plurality of flowcharts used in the above-mentioned description, however, the execution order of the steps to be executed in each exemplary embodiment is not limited to the order in that description. In each exemplary embodiment, the order of the steps that are illustrated can be subjected to a change in an extent which does not cause a trouble to the contents, such as execution of the respective steps in parallel. Alternatively, the contents described in the above-mentioned respective exemplary embodiments can be combined in such an extent that causes inconsistency in the contents.

As described above, the minutia features generation apparatus 10 according to the first exemplary embodiment calculates the relation minutia features related to the relationship between two minutiae, in addition to the minutia features such as the position and the direction of the minutia. The "contour skeleton count" is included in the relation minutia features. The contour skeleton count concerned has a different nature from the inter-minutia ridge line count disclosed in Non Patent Literature 2 and the like.

In the following, details of "inter-minutia ridge line count" disclosed in Non Patent Literature 2 and 3 will be described.

Note that, the "inter-minutia ridge line count" is usually calculated for all minutiae. Concretely, one minutia is selected from among all the minutiae appearing in the fingerprint image, and the selected minutia and minutiae located in the vicinity thereof are connected by a straight line, and the number of the ridge line that intersects the straight line is calculated as "inter-minutia ridge line count".

Figure 36:
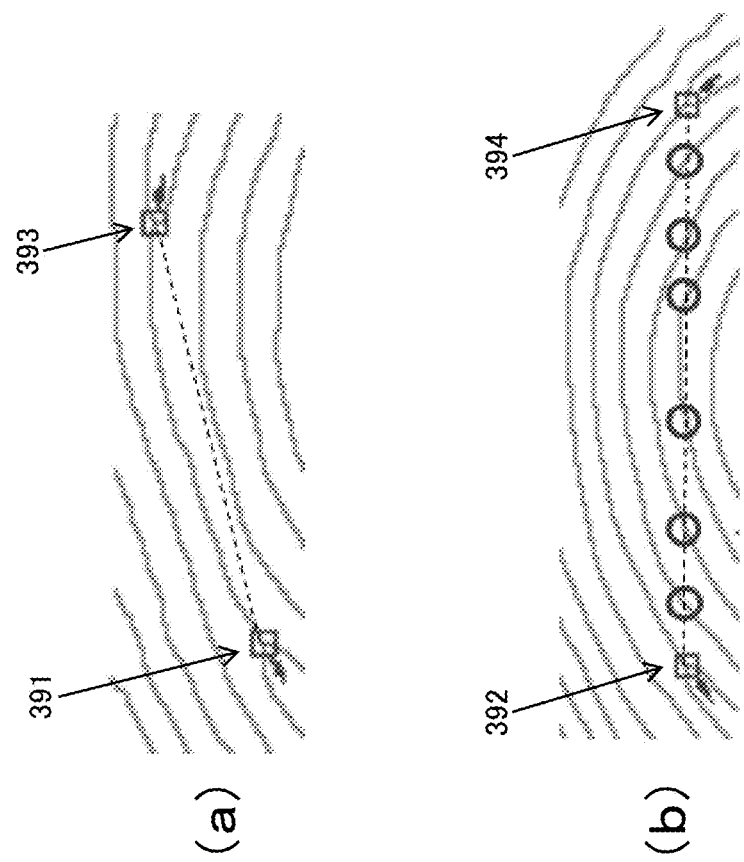
FIG. 36 shows a diagram explaining a technical problem(s) disclosed in Patent Literatures 2 and 3.

"Inter-minutia ridge line count" is usually not affected by the image distortion as much as the position of the paired minutiae, however, the effect of the image distortion becomes significant when the curvature of ridge line between the minutiae is large. For example, consider a case of calculating the "inter-minutia ridge line count" from two fingerprint images shown in FIG. 36. Here, it is assumed that the two fingerprint images shown in FIG. 36 are the fingerprint images obtained from the same finger of the same person (for example, fingerprint images related to an impressed fingerprint and a latent fingerprint). The minutia 391 in FIG. 36(*a*) and the minutia 392 in FIG. 36(*b*), the minutia 393 in FIG. 36(*a*) and the minutia 394 in FIG. 36(*b*) are the paired minutiae, respectively.

Referring to FIG. 36, it can be seen that there is a large difference in curving pattern (curvature) of the ridge lines between the minutia in each figure. More concretely, in FIG. 36(*a*), the ridge lines including the ridge lines connecting the two minutiae is substantially straight toward the upper right obliquely, whereas in FIG. 36(*b*), the ridge line is greatly curved. In FIG. 36(*a*), when the "inter-minutia ridge line count" regarding the minutiae 391 and 393 is calculated, the "inter-minutia ridge line count" becomes "0" since there is no ridge line that intersects the straight line connecting the two minutiae. In contrast, when calculating the "inter-minutia ridge line count" in FIG. 36 (*b*), "inter-minutia ridge line count" becomes "6", since the ridge line that interests the straight line connecting the two minutiae is 6 lines (6 points, circle in the figure represents the intersection).

In this way, despite the fingerprint images obtained from the same person, the "inter-minutia ridge line count" may differ greatly. Further, in order to eliminate the above inconvenience, even if a countermeasure is taken such that the same ridge line is not counted twice, the number of ridge lines intersecting with the straight line in FIG. 36(*b*) becomes 3, in which "inter-minutia ridge line count" is still very different.

The "inter-minutia ridge line count" disclosed in Non Patent Literature 2 and 3 is vulnerable to noise such as image distortion, so that high matching accuracy cannot be obtained by the matching process using "inter-minutia ridge line count". Thus, "inter-minutia ridge line count" has poor robustness (robust nature) when image distortion is significant, and there is a limit to the contribution to improving matching accuracy (may also cause a deterioration of matching accuracy). As described above, in case a latent fingerprint with significant image distortion is to be matched, when using the "inter-minutia ridge line count" as disclosed in Non Patent Literatures 2 and 3, a difference may be brought about in "inter-minutia ridge line count" between the latent fingerprint and the impressed fingerprint as the counter-fingerprint. Therefore, high-precision matching cannot be expected with such matching processing using the "inter-minutia ridge line count". In addition, since it is not possible to extract a sufficient number of minutiae from a small area of the latent fingerprint, in case the number of minutiae is small, there is little information to calculate the "inter-minutia ridge line count", thus high-precision matching cannot be expected.

On the other hand, the minutia features generation apparatus 10 according to the first exemplary embodiment treats the skeleton as the contour line and calculates the number of contour lines (the skeleton, the ridge line) existing between two minutiae as the inter-minutia ridge line count between tow minutiae. Further, as described above, the inter-minutia ridge line count calculated by treating the skeletons as contour lines (number of contour core lines) is characterized by that it is not easily affected by image distortion (it is robust against image distortion). As a result, by using the minutia (feature) values for the matching processing of the two fingerprint images, it is possible to accurately perform determination of the paired minutiae and calculation of the matching score on the file side.

Further, Patent Literature 1 discloses "ridge line connection related information" between the two neighboring minutiae as a new minutia feature (feature amount). In more detail, in Patent Literature 1, information related to other minutiae existing on a ridge existing in the vicinity of the minutia is referred to as "ridge line connection related information" (see paragraph of Patent Literature 1).

Figure 37:
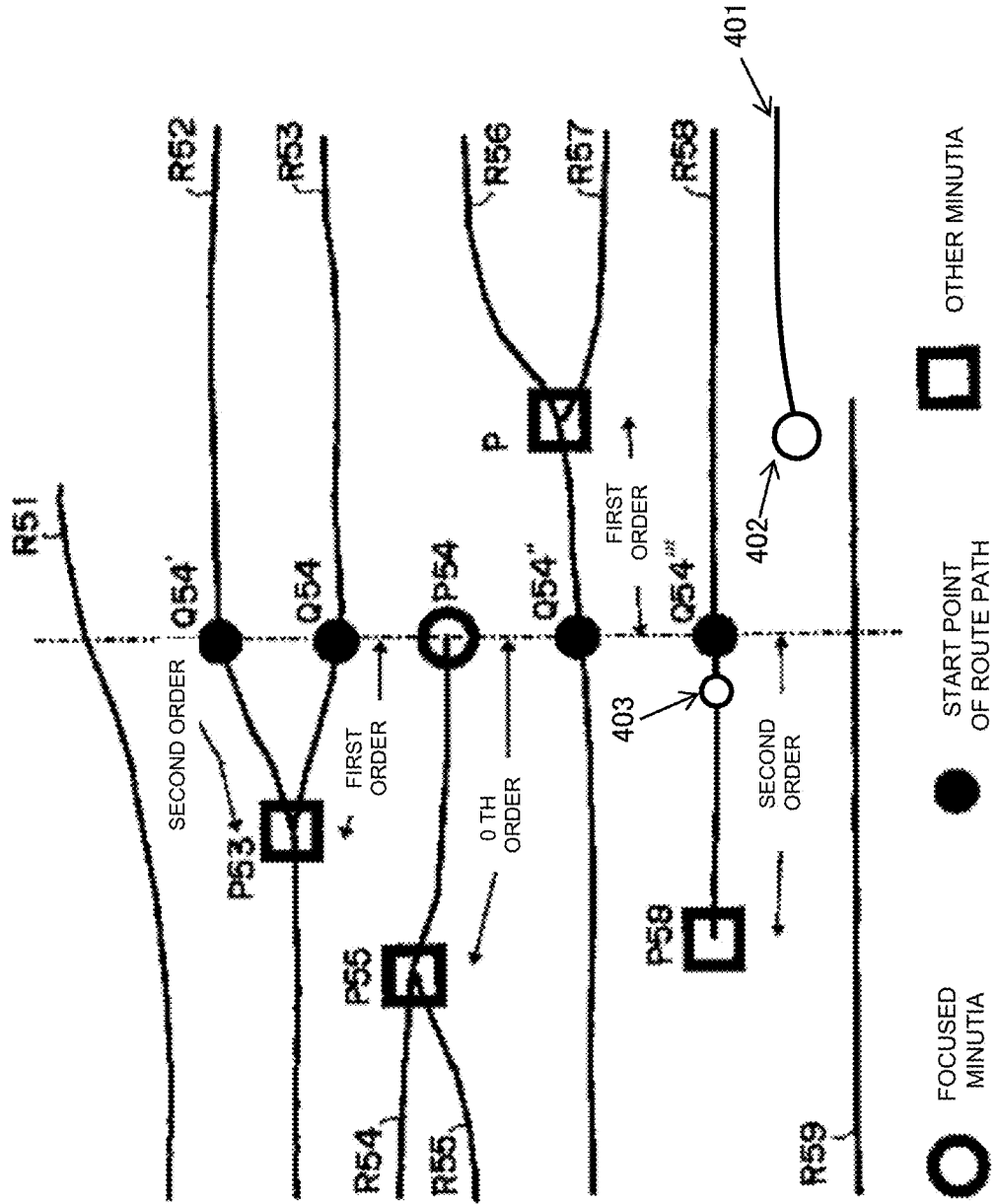
FIG. 37 shows a diagram explaining a technical problem(s) of the technology disclosed in Patent Literature 1.

Here note that, in the fingerprint image, the skeleton may be interrupted due to the influence of noise etc. In FIG. 37, consider a case in case there is a discontinuity (blank) between the minutia P58 and the route measurement starting point Q54'''. In this case, in the method disclosed in Patent Literature 1, the first minutia 403 obtained by tracing the skeleton from the route measurement starting point Q54''' is extracted as the nearest neighbor minutia, however, the minutia P58 located at a faster point beyond the first minutia 403 is not extracted as the nearest neighbor minutia. However, the target minutia P54 and the minutia P58 are located close enough, and thus without extracting the minutia P58 as the nearest neighbor minutia and without calculating the minutia features, it is not expectable to contribute to improve the matching accuracy. That is, since minutia features such as "ridge line connection related information" disclosed in Patent Literature 1 cannot exhaustively extract the minutia located in vicinity of the minutia, contribution to the improvement of the matching accuracy is limited.

In contrast, the minutia features generation apparatus 10 according to the first exemplary embodiment has no particular limitation on extraction of the minutiae located in the vicinity of the parent minutia, and exhaustively extracts the minutiae located in the vicinity of the parent minutia, so that the improvement of the matching accuracy using the relation minutia features is expected.

Further, the minutia features generation apparatus 10 employs the ridge line direction tracing instead of skeleton tracing when calculating the contour skeleton count. Since the ridge line direction tracing is robust to the minutia(e) caused by noise existing on the tracing route, the contour skeleton count can be calculated with high accuracy.

Furthermore, the minutia features generation apparatus 10 calculates the relational minutia features including the direction in which the child minutia exists as seen from the parent minutia (the child minutia relative direction) and the position of the child minutia as seen from the nearest neighbor point (the child minutia relative position). Since these minutia features are also robust against image distortion, they can be effectively used as minutia features when matching the two fingerprint images.

Figure 24:
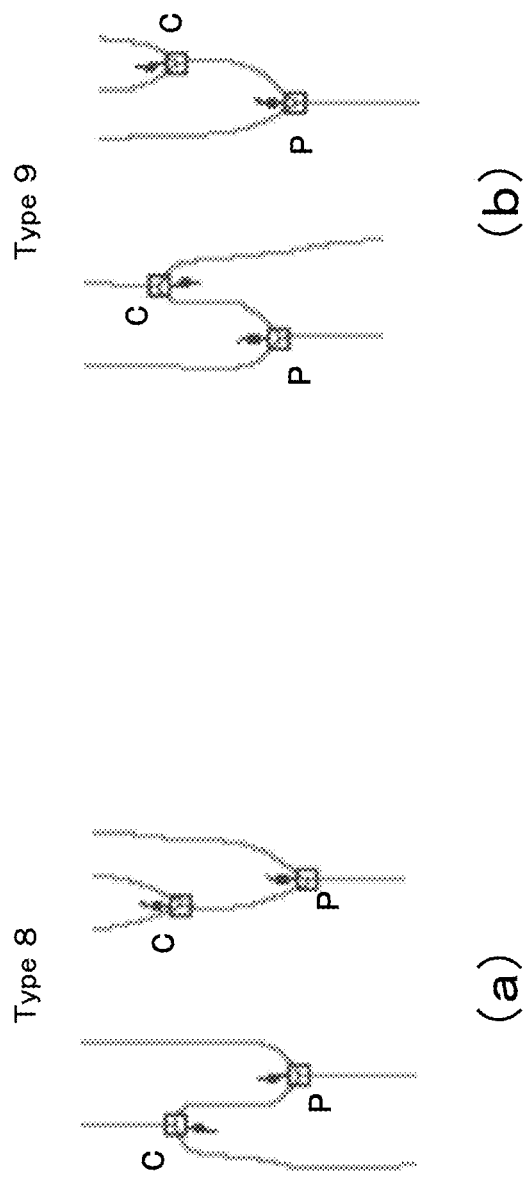
FIG. 24 shows a diagram explaining connection types.
Figure 25:
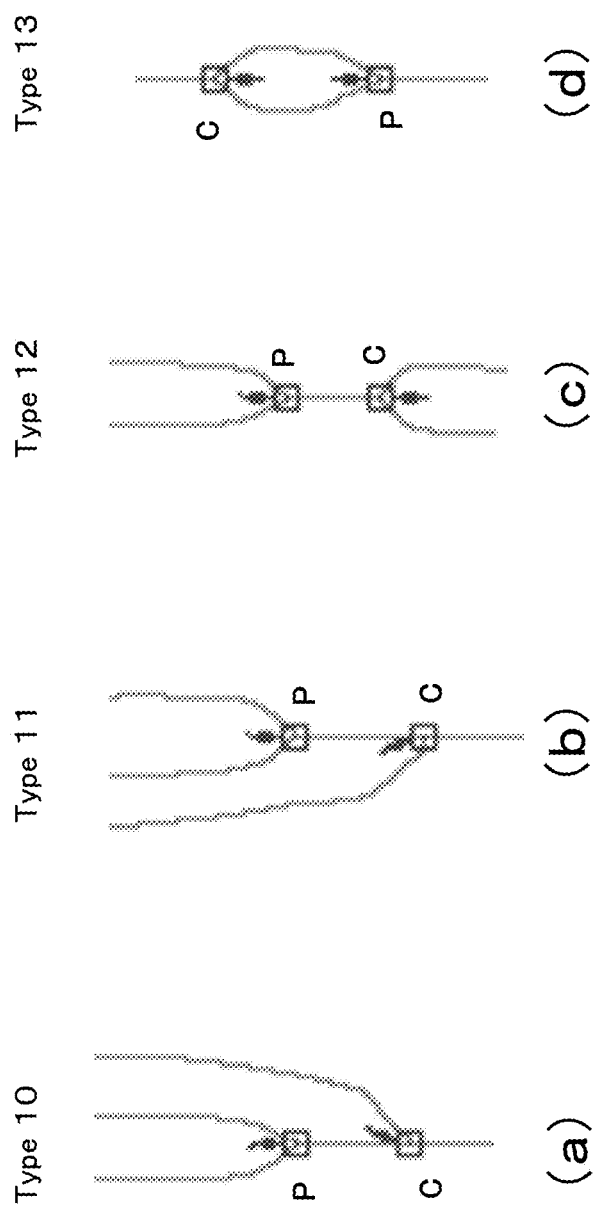
FIG. 25 shows a diagram explaining connection types.
Figure 26:
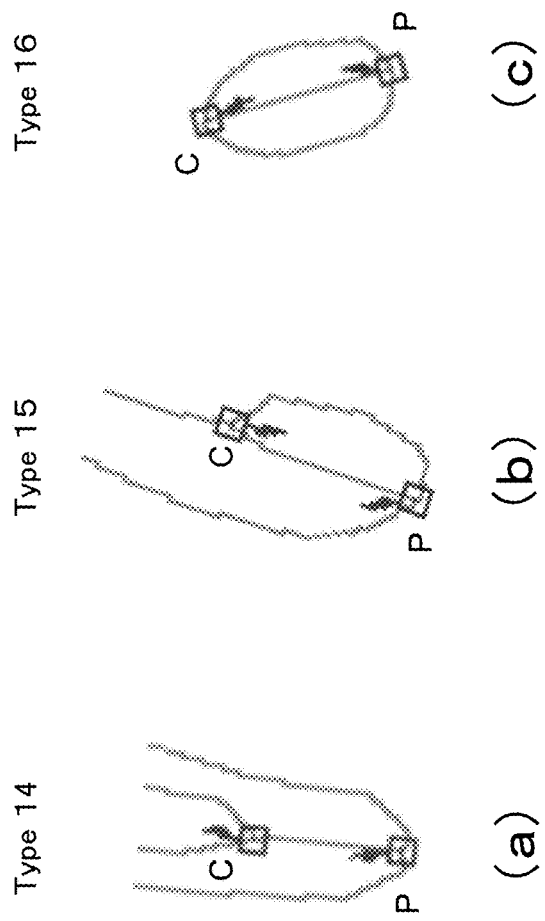
FIG. 26 shows a diagram explaining connection types.

Furthermore, in case the two minutiae are directly connected by skeleton(s), the minutia features generation apparatus 10 specifies (identifies) the connection form of the two minutiae. By using such connection type as the minutia features used for the matching process, more accurate matching process is possible. For example, in case no minutia features are introduced depending on the connection type, the two minutiae as shown in FIG. 24(a) and FIG. 24(b), and the two minutiae as shown in FIG. 25(d) may be difficult to, be distinguished by the contour skeleton count. However, by using the connection type as the minutia features, it is possible to more accurately perform the matching between the minutiae as shown in FIG. 24 (a) and FIG. 25 (d). Alternatively, since TYPE16 as shown in FIG. 26(c) and TYPE14 as shown in FIG. 26 (a) have a special skeleton form, which are not normally considered to appear outside the core (fingerprint center), accurate matching results can be obtained by using the connection type related minutia features for matching processing. In particular, the connection type calculated by the minutia features generation apparatus 10 is effective in the minutiae pairing process. Concretely, in case certain minutiae are paired at a particular timing in the pairing determination process, child minutiae each other having the same type of connection type can also be determined as paired minutiae. For example, in FIG. 17, if the parent minutia 371 and the parent minutia 381 are determined to be paired at a specific timing, the child minutia 374 and the child minutia 383 connected to each parent minutia by the connection type TYPE12 can be immediately determined as the paired minutiae.

Part or all of the above-mentioned exemplary embodiments can be described as the followings but is not limited to the followings.

<Mode 1>

A minutia features generation apparatus according to the first aspect, as described above.

<Mode 2>

The minutia features generation apparatus, preferably according to the mode 1, wherein the calculation part firstly selects the first minutia from the plurality of minutiae, followed by extracting a predetermined number of minutiae, arranged in the order of proximity to the first minutia; and sets a predetermined number of the extracted minutiae as the second minutiae.

<Mode 3>

The minutia features generation apparatus, preferably according to mode 1 or 2, wherein the generation part generates a ridge line direction data including information related to a ridge line direction at each point on the ridge line(s) making up the image; and the calculation part calculates a trace line by tracing a ridge line direction using the ridge line direction data, and identifies the nearest neighbor point.

<Mode 4>

The minutia features generation apparatus, preferably according to mode 3, wherein the calculation part calculates a minutia direction that features at least a direction of the first minutia; identifies a first nearest neighbor point candidate, which is a candidate of the nearest neighbor point by performing the ridge line direction tracing in a direction directed to a first trace direction which is the same direction as the minutia direction; identifies a second nearest neighbor point candidate, which is a candidate of the nearest neighbor point by performing the ridge line tracing in a direction directed to a second trace direction which is an opposite direction of the minutia direction; and identifies the nearest neighbor point from the first and second nearest neighbor point candidates, based on a closer distance to the second minutia.
<Mode 5>

The minutia features generation apparatus, preferably according to mode 4, wherein the calculation part calculates one of the relational minutia features, as defined by a result whether the trace direction used for identification of the nearest neighbor point is the same direction as the minutia direction of the first minutia or an opposite direction thereof.
<Mode 6>

The minutia features generation apparatus, preferably according to mode 5, wherein the calculation part calculates, as one of the relation minutia features, a position where the second minutia locates based on the trace direction used for identification of the nearest neighbor point.
<Mode 7>

The minutia features generation apparatus, preferably according to any one of modes 1 to 6, wherein the calculation part calculates, with respect to the minutia(e) extracted from the skeletons, a position, a direction, and a type as minutia features that features the minutia.
<Mode 8>

The minutia features generation apparatus, preferably according to mode 7, wherein the calculation part calculates a connection type, as a minutia feature, the connection type being between the first minutia and the second minutia, in case the first minutia and the second minutia is connected by at least one or more skeletons.
<Mode 9>

The minutia features generation apparatus, preferably according to mode 8, wherein the calculation part calculates the connection type on the basis of: a direction and a type related to each of the first and second minutia; a number of connecting skeleton(s) between the first and the second minutia; and a type of a skeleton connected to the other minutia among three skeletons which form a bifurcation point, in case at least one of the first and the second minutia is a bifurcation type.
<Mode 10>

The minutia features generation apparatus, preferably according to mode 9, wherein the calculation part calculates a type of each of the three skeletons in accordance to quadrant in which any of three skeletons forming the bifurcation point exists, on a two-dimensional coordinate system which comprises an origin at the location of the bifurcation point, and a Y-positive direction as a direction directed to the minutia direction featuring the bifurcation point.
<Mode 11>

The minutia features generation apparatus, preferably according to any one of modes 1 to 10, comprising: an output part configured to output to an external apparatus at least information related to the relation minutia features calculated by the calculation part.
<Mode 12>

A system according to the second aspect, as described above.

<Mode 13>

A minutia features generation method according to the third aspect, as described above.
<Mode 14>

A program according to the fourth aspect, as described above.

Note that modes 12 to 14 are possible to be extended like the way in case of mode 1, which is extended to modes 2 to 11.

Each disclosure of the above-mentioned Patent Literatures and so on that have been cited is incorporated herein in its entirety by reference. Modification and adjustment of each exemplary embodiment or each example are possible within the scope of the overall disclosure (including the claims) of the present invention and based on the basic technical concept of the present invention. Various combinations or selections (including partial deletion) of various disclosed elements (including each element in each claim, each element in each exemplary embodiment or each example, and each element in each drawing) are possible within the scope of the overall disclosure of the present invention. That is, the present invention naturally includes various variations and modifications that could be made by those skilled in the art according to the overall disclosure including the claims and the technical concept. With respect to numerical value range(s) described herein in particular, arbitrary numerical value(s) and a small range(s) included in the numerical value range should be construed to be specifically described even unless otherwise explicitly described.

REFERENCE SIGNS LIST

10, 100: minutia features generation apparatus
11: CPU(Central Processing Unit)
12: memory
13: input and output interface
14: NIC(Network Interface Card)
20: database
30: matching apparatus
101: input part
102: generation part
103: extraction part
104: calculation part
201, 221: fingerprint image input part
202, 222: skeleton image generation part
203, 223: minutia extraction part
204, 224: minutia features calculation part
205: minutia features output part
211: basic minutia features calculation part
212: relation minutia features calculation part
213: connection type calculation part
225: database (DB) access part
226: matching part
227: matching result output part
301-317, 321-326, 391-394, 402, 403: minutia
301 bifurcation point
332: minutia direction
333-335, 342: trace end point
341, 351, 421: end point
352: dotted line
353: ridge line direction data
361, 373: nearest neighbor point
362, 372, 374, 375, 382, 383: child minutia
371, 381: parent minutia
401, 422: skeleton

What is claimed is:

1. A minutia features generation apparatus, comprising:
an input part configured to input an image, formed as a curved stripe pattern by a ridge line(s);
a generation part configured to generate a skeleton image, formed by extracting a skeleton(s) from the image;
an extraction part configured to extract a plurality of minutiae from the skeleton image; and
a calculation part configured to calculate a relation minutia feature(s) representing relationship between a first minutia and a second minutia among the plurality of minutiae,
wherein,
the calculation part calculates as one of the relation minutia features defined by a crossing count of the skeleton(s) and a straight line connecting from the second minutia to a nearest neighbor point which is a point on a trace line traced by tracing starting from the first minutia, which point is located at a shortest line distance from the second minutia.

2. The minutia features generation apparatus according to claim 1, wherein
the calculation part firstly selects the first minutia from among the plurality of minutiae, followed by extracting a predetermined number of minutiae arranged in the order of proximity to the first minutia; and
sets a predetermined number of the extracted minutiae as the second minutia(e).

3. The minutia features generation apparatus according to claim 1, wherein
the generation part generates a ridge line direction data including information related to a ridge line direction at each point of the ridge line(s) making up the image; and
the calculation part calculates a trace line by tracing the ridge line direction using the ridge line direction data, and identifies the nearest neighbor point.

4. The minutia features generation apparatus according to claim 3, wherein
the calculation part calculates a minutia direction that features at least a direction of the first minutia;
identifies a first nearest neighbor point candidate, which is a candidate of the nearest neighbor point by performing the ridge line direction tracing in a direction directed to a first trace direction which is the same direction as the minutia direction;
identifies a second nearest neighbor point candidate, which is a candidate of the nearest neighbor point by performing the ridge line direction tracing in a direction directed to a second trace direction which is an opposite direction of the minutia direction; and
identifies the nearest neighbor point from the first and second nearest neighbor point candidates, based on a closer distance to the second minutia.

5. The minutia features generation apparatus according to claim 4, wherein
the calculation part calculates one of the relational minutia features, as defined by a result whether the trace direction used for identification of the nearest neighbor point is the same direction as the minutia direction of the first minutia or an opposite direction thereof.

6. The minutia features generation apparatus according to claim 5, wherein
the calculation part calculates, as one of the relation minutia features, a position where the second minutia locates based on the trace direction used for identification of the nearest neighbor point.

7. The minutia features generation apparatus according to claim 1, wherein
the calculation part calculates, with respect to the minutiae extracted from the skeletons, a position, a direction and a type, as minutia features that feature the minutia.

8. The minutia features generation apparatus according to claim 7, wherein
the calculation part calculates a connection type, as a minutia feature, the connection type being between the first minutia and the second minutia, in case the first minutia and the second minutia are connected by at least one or more skeletons.

9. The minutia features generation apparatus according to claim 8, wherein
the calculation part calculates the connection type on the basis of:
a direction and a type related to each of the first and second minutia;
a number of connecting skeleton(s) between the first and the second minutia; and
a type of a skeleton connected to the other minutia among three skeletons which form a bifurcation point, in case at least one of the first and the second minutia is a bifurcation type.

10. The minutia features generation apparatus according to claim 9, wherein
the calculation part calculates a type of each of the three skeletons in accordance to quadrant in which any of three skeletons forming the bifurcation point exists, on a two-dimensional coordinate system which comprises an origin at the location of the bifurcation point, and a Y-positive direction as a direction directed to the minutia direction featuring the bifurcation point.

11. The minutia features generation apparatus according to claim 1, further comprising:
an output part configured to output to an external apparatus at least information related to the relation minutia features calculated by the calculation part.

12. A system, comprising:
the minutia features generation apparatus according to claim 1, and
a matching apparatus configured to perform matching of images using the minutia features generated by the minutia features generation apparatus.

13. A minutia features generation method, comprising:
inputting an image formed as a curved stripe pattern by a ridge line(s);
generating a skeleton image formed by extracting a skeleton(s) from the image;
extracting a plurality of minutiae from the skeleton image; and
calculating a relation minutia feature(s) representing relationship between a first minutia and a second minutia among the plurality of minutiae, wherein
the calculating is performed by calculating as one of the relation minutia features defined by a crossing count of the skeleton(s) and a straight line connecting from the second minutia to a nearest neighbor point which is a point on a trace line traced by tracing starting from the first minutia, which point is located at a shortest line distance from the second minutia.

14. The minutia features generating method according to claim 13, wherein
the calculating is performed by firstly selecting the first minutia from among the plurality of minutiae, followed by extracting a predetermined number of minutiae arranged in the order of proximity to the first minutia; and sets a predetermined number of the extracted minutiae as the second minutia(e).

15. The minutia features generating method according to claim 13, wherein the generating is performed by generating a ridge line direction data including information related to a ridge line direction at each point of the ridge line(s) making up the image; and calculating a trace line by tracing the ridge line direction using the ridge line direction data, and identifies the nearest neighbor point.

16. The minutia features generating method according to claim 15, wherein the calculating is performed by calculating a minutia direction that features at least a direction of the first minutia;

identifying a first nearest neighbor point candidate, which is a candidate of the nearest neighbor point by performing the ridge line direction tracing in a direction directed to a first trace direction which is the same direction as the minutia direction;

identifying a second nearest neighbor point candidate, which is a candidate of the nearest neighbor point by performing the ridge line direction tracing in a direction directed to a second trace direction which is an opposite direction of the minutia direction; and identifying the nearest neighbor point from the first and second nearest neighbor point candidates, based on a closer distance to the second minutia.

17. The minutia features generation method according to claim 16, wherein the calculating is performed by calculating one of the relational minutia features, as defined by a result whether the trace direction used for identification of the nearest neighbor point is the same direction as the minutia direction of the first minutia or an opposite direction thereof.

18. The minutia features generation method according to claim 17, wherein the calculating is performed by calculating, as one of the relation minutia features, a position where the second minutia locates based on the trace direction used for identification of the nearest neighbor point.

19. The minutia features generation method according to claim 13, wherein the calculating is performed by calculating, with respect to the minutiae extracted from the skeletons, a position, a direction and a type, as minutia features that feature the minutia.

20. A computer readable non-transient recording medium storing a program causing a computer to perform processing of:

inputting an image formed as a curved stripe pattern by a ridge line(s);

generating a skeleton image formed by extracting a skeleton(s) from the image;

extracting a plurality of minutiae from the skeleton image; and calculating a relation minutia feature(s) representing relationship between a first minutia and a second minutia among the plurality of minutiae, wherein, the calculating is performed by calculating as one of the relation minutia features defined by a crossing count of the skeleton(s) and a straight line connecting from the second minutia to a nearest neighbor point which is a point on a trace line traced by tracing starting from the first minutia, which point is located at a shortest line distance from the second minutia.

* * * * *